(12) United States Patent
Mochizuki et al.

(10) Patent No.: US 8,976,435 B2
(45) Date of Patent: Mar. 10, 2015

(54) LIGHT QUANTITY ADJUSTMENT APPARATUS AND IMAGE PICKUP APPARATUS

(75) Inventors: Naoto Mochizuki, Fuefuki (JP); Kenji Masuyama, Kofu (JP); Yosuke Sajiki, Kofu (JP); Takahiro Nishimoto, Kai (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 177 days.

(21) Appl. No.: 13/317,735

(22) Filed: Oct. 27, 2011

(65) Prior Publication Data

US 2012/0154884 A1    Jun. 21, 2012

(30) Foreign Application Priority Data

Nov. 18, 2010  (JP) ................. 2010-258164
Nov. 19, 2010  (JP) ................. 2010-259364
Nov. 24, 2010  (JP) ................. 2010-261453

(51) Int. Cl.
  *G02B 26/02* (2006.01)
  *H04N 5/225* (2006.01)
  *G03B 9/06* (2006.01)

(52) U.S. Cl.
  CPC ............. *H04N 5/2254* (2013.01); *G03B 9/06* (2013.01)
  USPC ......................... 359/234; 396/493

(58) Field of Classification Search
  CPC .............................................. G03B 9/08–9/26
  USPC .......... 359/227, 233–236; 396/235, 246, 355, 396/357, 449, 452–453, 461, 483–490, 493, 396/498
  See application file for complete search history.

(56) References Cited

U.S. PATENT DOCUMENTS

| | | | | |
|---|---|---|---|---|
| 4,272,160 A | * | 6/1981 | Uesugi ........................ | 359/700 |
| 6,139,202 A | * | 10/2000 | Depatie et al. ............... | 396/449 |
| 7,113,318 B2 | * | 9/2006 | Onuki et al. .................. | 359/234 |
| 2002/0034390 A1 | * | 3/2002 | Naganuma .................... | 396/452 |

FOREIGN PATENT DOCUMENTS

| | | |
|---|---|---|
| JP | 2006-322979 | 11/2006 |
| JP | 2009-020438 | 1/2009 |

* cited by examiner

*Primary Examiner* — Stephone B Allen
*Assistant Examiner* — James McGee
(74) *Attorney, Agent, or Firm* — Manabu Kanesaka

(57) ABSTRACT

A light quantity adjustment apparatus includes a pair of substrates having a light-path aperture; a plurality of diaphragm blades disposed between the pair of substrates; a driving ring that opens and closes the plurality of diaphragm blades; and a driving device. The plurality of diaphragm blades is supported by the substrate via a first guide plate made of a resin film. The substrate and the first guide plate are provided with guide grooves fitted into protrusions formed in the plurality of diaphragm blades to guide the blades. Guide grooves of the substrate are formed of concave grooves. Guide grooves of the first guide plate are formed of through holes. The through holes of the first guide plate have a narrower width than the concave grooves of the substrate to engage in the protrusions of the diaphragm blades and to guide the diaphragm blades in the open and close direction.

19 Claims, 14 Drawing Sheets

LIGHT QUANTITY ADJUSTMENT APPARATUS AND IMAGE PICKUP APPARATUS

BACKGROUND OF THE INVENTION AND RELATED ART STATEMENT

1. Field of the Invention

The present invention relates to a light quantity adjustment apparatus that is incorporated into an image pickup apparatus such as a video camera and still camera or a projection apparatus such as a projector and that adjusts a quantity of light such as a shooting light quantity and projection light quantity.

2. Description of the Prior Art

Generally, this type of light quantity adjustment apparatus is known as an apparatus in which a substrate having an optical-axis aperture in a shooting light path (or projection light path) is disposed, a plurality of light quantity adjustment blades is disposed in the substrate to be openable and closable so as to make the optical-axis aperture a large diameter or a small diameter, and a quantity of light is thereby adjusted.

For example, Patent Document 1 [Japanese Patent Application Publication No. 2009-20438 (FIG. 1, FIG. 4)] discloses an iris diaphragm apparatus in which a plurality of blades is disposed around an optical-axis aperture formed in a substrate, and opens and closes the light path diameter from a small diameter to a large diameter in similar shapes. It is known that such a diaphragm apparatus has the feature of adjusting a quantity of light in multi-stage with diameters close to a circular shape using a plurality of blades.

The Document discloses an open/close mechanism in which a plurality of diaphragm blades is disposed between a pair of upper and lower ring-shaped substrates having a light-path aperture at the center, and is opened and closed by a driving unit provided in one of the substrates.

Further, Patent Document 2 [Japanese Patent Application Publication No. 2006-322979 (FIG. 1)] discloses an apparatus in which a plurality of diaphragm blades is disposed between substrates formed in the shape of a ring as in Document 1, and is opened and closed by a driving unit provided in one of the substrates. Such an apparatus is known well that a plurality of blades is disposed around the light-path aperture in the shape of scales, and is opened and closed by a driving unit provided in one of the substrates.

Then, in a mechanism for opening and closing a plurality of blades, guide grooves are provided in the substrate along the trajectory of motion of the blades, pins planted in the blades are fitted into the guide grooves, the blades are rotated in a predetermined direction by a transmission ring provided in the other substrate, and the motion of the plurality of blades is thereby regulated. In the substrate for supporting the blades, guide grooves corresponding to the number of blades are disposed around the light-path aperture. The structure of the guide grooves is disclosed in FIG. 4 of Patent Document 1.

Further, Patent Document 2 discloses an apparatus for adjusting a quantity of light in the optical-axis aperture of the substrate with two blades. Then, the substrate is provided with an electromagnetic driving unit that opens and closes a plurality of blades, and rotation of the driving unit is to shift rotationally a plurality of blades concurrently by a driving ring in the apparatus of Patent Document 1, and is to shift slidably two blades concurrently by a driving arm in the apparatus of Patent Document 2.

The diaphragm apparatus as described above is already known in Patent Documents 1, 2, etc. in which a plurality of blades is disposed around a light-path aperture, and is opened and closed to adjust the light-path diameter to be larger and smaller. In this case, a plurality of diaphragm blades is supported between a pair of upper and lower substrates formed of a synthetic resin or metal, and the front end portions of the blades face the light-path aperture, while the base end portions thereof are supported in the substrate around the light-path aperture.

Therefore, conventionally, for example, a ring-shaped driving ring is provided in one of the substrates, the driving ring is rotated by a driving unit, and the motion is transmitted to each blade member. Then, in the other substrate, guide holes are provided in the motion direction to accurately open and close the blade front end portions, and are fitted into the pins provided in the blades.

In the blade open/close mechanism with such a structure, a plurality of guide grooves is provided around the light-path aperture in the substrate, and conventionally, the guide holes are configured in the shape of a slit piercing the front and back sides of the substrate and are integrally formed with the substrate.

Meanwhile, the blade members are formed by performing die-cutting forming on a film member (for example, polyethylene film) of a synthetic resin in a predetermined shape, and then, pins are planted in the film members by welding or the like.

The fit state of the guide hole and the planted pin in the conventional blade open/close mechanism will be described with reference to FIGS. 11A to 11C. As shown in FIG. 11A, in a substrate 100, a guide hole 101 is formed by die forming, and a planted pin 102 of a blade 104 is fitted into the guide hole. At this point, the guide hole 101 needs a gap to slide between a cutting taper θ in die forming and the inner diameter of the hole. Due to the taper and gap, the planted pin 102 is sometimes inclined as shown in FIG. 11B. The cause is that the front end of the planted pin comes into point-contact with the inner wall of the guide hole, the blade is inclined by the inclination of the planted pin, and accurate open/close action is not obtained.

Concurrently with this problem, as shown in FIG. 11C, since the guide hole 101 is formed in the shape of a long hole along the trajectory in the open/close direction of the blade, exterior light enters toward a light-path aperture 103 in the direction of the arrow in FIG. 11C. This guide hole is formed in a plurality of portions around the light-path aperture, and therefore, there is the problem that the exterior light enters inside the light path.

Further, in the above-mentioned conventional apparatus, each blade member is directly supported between the first substrate and the driving ring to be openable and closable, and therefore, the following problems occur. Smooth motion of the blade is hindered by frictional resistance occurring between each blade member and the first substrate or between each blade member and the driving ring, and concurrently therewith, power consumption in the driving apparatus is large, resulting in the problem.

Furthermore, static electricity is generated between the first substrate and blade members or between the driving ring and blade members due to open/close action of the blades, and it is known that open/close failure of the blade is caused when the static electricity is charged and accumulated. Conventionally, to prevent static electricity from being accumulated, for example, the substrate is made by forming of resin with conductive metal or conductive fibers such as carbon mixed. However, when fibers are mixed, the fibers are exposed to the substrate surface, and interfere with motion of the blade.

Therefore, the inventor of the invention arrived at the idea of providing guide plates between blades and a substrate and between blades and a driving ring in supporting a plurality of blade members between a pair of upper and lower substrates to be openable and closable, and reducing frictional resistance by the guide plate, while at the same, reducing the occurrence of static electricity.

However, when the inventor produced the blades and guide plates by die-cutting forming of a polyethylene resin film and observed the open/close state of the blades, the following problem newly occurred.

Fit holes are provided in the driving ring and the guide plate provided therein and fitted into protrusions (pins) of the blades, and a plurality of blades is opened and closed by rotation of the driving ring. At this point, due to misalignment of the fit holes of the ring and plate, and accuracy difference of the hole inner diameters, the blade is regulated by the fit hole of the plate to be opened and closed, and is sometime not in conjunction with open/close motion of the driving ring. Also in the case of providing guide grooves to regulate open/close motion of the blades in the substrate and the guide plate provided therein, when misalignment and accuracy error occur between mutual guide grooves, the blades perform unstable open/close motion.

This state is shown in FIGS. 12A to 12C. When a backlash $\Delta t1$ occurs between a fit hole 111 of a driving ring 110 and a fit hole 121 of an upper guide plate 120 due to misalignment or dimension accuracy, for example, at the time the driving ring rotates in a clockwise direction to open and close blades 104, as shown in FIG. 12B, some blade rotates faster by $\Delta t1$, while another blade rotates slower by $\Delta t1$. Then, when the driving ring 110 rotates in a counterclockwise direction, inversely, the blade rotates slower by $\Delta t1$, and deviation of the aperture amount occurs in the aperture diameter of the blades. Similarly, in between the substrate 100 and a lower guide plate 105 provided therein, when a guide groove 102 and a guide groove 103 cause a backlash due to misalignment or dimension accuracy, and as shown in FIG. 12C, a backlash $\Delta t2$ occurs, the open/close trajectory of the blade deviates by $\Delta t2$.

Further, in the above-mentioned conventional apparatus, a plurality of blades is disposed between a pair of upper and lower substrates having light-path apertures to be openable and closable, and the diaphragm apparatus for adjusting the light-path diameter to be larger and smaller by the plurality of blades is already known in Patent Documents 1 and 2, etc. In this case, to concurrently open and close a plurality of diaphragm blades, such an open/close mechanism is known that the driving ring is provided in one of the substrates to be rotatable, and the driving ring and each blade member are coupled by pin-slit connection to drive open and close.

As the conventional open/close mechanism, there known an arm transmission mechanism in which an arm is provided in a place of the driving ring, and is coupled to a transmission lever coupled to a driving source such as an electromagnetic driving apparatus, and a gear transmission mechanism in which a driving gear is provided in the rotary shaft coupled to the driving source, and a tooth form meshing with the driving gear is formed in the driving ring.

In the former arm transmission mechanism, a rotation ring is provided around the light-path aperture, the arm extends from the ring to the outside of the aperture and is coupled to the driving apparatus, and therefore, the problem is known that the apparatus is made a large diameter to the outside of the aperture. Meanwhile, in the latter blade open/close mechanism by gear transmission, the rotation ring provided around the light-path aperture and the driving apparatus are coupled by gear, and therefore, the problem is known that the gear connection portion protrudes to the outside of the ring and that the apparatus is made a large diameter.

Then, in the gear transmission mechanism, attempts are made such that a concave portion (cut) is provided on the light-path center side in part of the outer region of the driving ring, and that the gear coupling portion is disposed inside the concave portion. In such a transmission structure, since the gear coupling portion does not protrude to the outside of the driving ring, it is possible to make the apparatus a small diameter.

FIG. 13 shows the gear transmission mechanism. A blade 101 is supported between a pair of upper and lower substrates 100a, 100b, the driving ring 102 is disposed in one of the substrates to be rotatable, a concave portion 105 is formed by cutting part of the driving ring, a tooth form 108 is formed in the end face of the cut concave portion 105 to mesh with a driving gear 109 of a driving apparatus (not shown), and in this case, the following problem occurs.

As shown in FIG. 13B, the blade sometimes warps and sinks into the cut concave portion 105 formed in the driving ring 102. In other words, the blade 101 is sandwiched and supported between one of the substrates, 100a, and the driving ring 102 to be openable and closable, the cut concave portion 105 is provided in part of the driving ring, and therefore, the blade such that the open/close trajectory is positioned in the cut concave portion may partially warp and sink into the inside of the concave portion. FIG. 13B shows this state. When the base end portion of the blade sinks into the inside of the concave portion, there is the problem that the blade front end floats and interferes with the other blade front end, and in the case of the mechanism for fitting a protrusion 106 of the blade and a guide groove 107 of the substrate as shown in the figure, smooth motion is prevented in the fit portion.

In this case, when the cut concave portion of the driving ring is formed outside the open/close trajectory of the blade, sinking of the blade is avoided, but the driving ring is made a large diameter to the outside of the motion trajectory of the blade, the size of the diaphragm apparatus is increased concurrently with increases in slide friction with the blade, and the problem arises that the barrel of the image pickup apparatus to incorporate the diaphragm apparatus is increased in size.

OBJECT OF THE INVENTION

<First Object>

Then, the inventor arrived at the idea of providing a sheet of a resin film between the blades and the substrate, obtaining smooth open/close action of the blades, and concurrently therewith, solving the above-mentioned problem. Therefore, the inventor invented that concavo grooves to which exterior light does not enter are formed in the substrate, and that guide grooves for regulating the blades in the open/close direction are formed in a resin film.

It is a first object of the invention to provide a light quantity adjustment apparatus in which in covering a light-path aperture with a plurality of blades to be openable/closable to adjust a quantity of light, open/close motion of blades is smooth to enable a quantity of light to be accurately adjusted, while there is a low risk that exterior light enters inside the light path.

<Second Object>

Further, it is an object of the invention to provide a light quantity adjustment apparatus in which in opening and closing a plurality of diaphragm blades supported between a pair of substrates to be openable and closable by the driving ring, frictional resistance acting on between the substrate and blades and between the driving ring and blades is low, and the blades are allowed to perform smooth open/close action while being opened and closed by the accurate trajectory of motion. Moreover, it is a second object of the invention to provide a light quantity adjustment apparatus with less static electricity that is generated and accumulated by open/close action of the blades.

<Third Object>

Furthermore, it is a third object of the invention to provide a light quantity adjustment apparatus for reducing sliding friction between the blades and the ring in opening and closing a plurality of diaphragm blades that open and close a light-path aperture by the driving ring, while obtaining smooth open/close motion without the blade warping and deforming.

SUMMARY OF THE INVENTION

<Means for Attaining the First Object>

To attain the above-mentioned object, in the present invention, a plurality of diaphragm blades is supported on a substrate to be openable and closable via a first guide plate formed of a resin film, and a protrusion formed in each diaphragm blade is fitted into a guide groove formed in each of the first guide plate and the substrate. Then, the invention is characterized by configuring so that the guide groove of the substrate is formed of a concave groove, the guide groove of the first guide plate is formed of a through hole, and that the through hole of the first guide plate has a narrower Width than that of the concave groove of the substrate to engage in the protrusion of the diaphragm blade, and guides the diaphragm blade in the open/close direction.

Further, the configuration will be described specifically. The configuration is provided with a substrate (11) having a light-path aperture, a plurality of diaphragm blades (21) that adjust a quantity of passing light of the light-path aperture, a driving ring (31) that opens and closes the plurality of diaphragm blades, and driving means (M) that drives the driving ring. Then, the plurality of diaphragm blades is supported on the substrate via a first guide plate (15) formed of a resin film, and the substrate and the first guide plates are provided with guide grooves (13, 16) that are fitted into protrusions formed in the plurality of diaphragm blades to guide the blades in the open/close direction. It is configured that the guide grooves (13) of the substrate are formed of concave grooves, the guide grooves (16) of the first guide plates are formed of through holes, and that the through holes of the first guide plates have a narrower width than that of the concave grooves of the substrate to engage in the protrusions (22) of the diaphragm blades, and guide the diaphragm blades in the open/close direction.

<Means for Attaining the Second Object>

To attain the above-mentioned object, in the invention, in overlaying a first substrate, diaphragm blades, a driving ring and a second substrate in this order in a layered form, a first guide plate is provided between the first substrate and the blades, a second guide plate is provided between the driving ring and the blades, guide grooves that are fitted into first protrusions formed in the blades are disposed in the first substrate and the first guide plate, and engagement holes that engage in second protrusions formed in the blades are disposed in the second substrate and the second guide plate. At this point, it is a feature that the guide grooves of the first guide plate are configured in a narrower width than the guide grooves of the first substrate, and that fit holes of the driving ring are configured in a smaller diameter than the engagement holes of the second guide plate.

Further, the configuration will be described specifically. The configuration is provided with a pair of substrates comprised of a first substrate and a second substrate (11, 41) each having a light-path aperture (12), a plurality of diaphragm blades (21) disposed between the pair of substrates to adjust a quantity of passing light of the light-path aperture, a driving ring (31) that opens and closes the plurality of diaphragm blades, and a driving apparatus (M) that rotates the driving ring a predetermined rotation angle. The pair of substrates, the diaphragm blades, and the driving ring form a light-path aperture substantially at the center, the first substrate, the diaphragm blades, the driving ring, and the second substrate are overlaid in this order in a layered form, the first guide plate is provided between the first substrate and the diaphragm blades, and the second guide plate is provided between the driving ring and the diaphragm blades. Then, guide grooves that are fitted into a first protrusion formed in each of the plurality of diaphragm blades are formed in the first substrate and the first guide plate, and fit holes that are fitted into a second protrusion formed in each of the plurality of diaphragm blades are formed in the driving ring and the second guide plate.

Then, guide grooves (16) formed in the first guide plate are configured in a narrower width than guide grooves (13) formed in the first substrate, and fit holes (33) formed in the driving ring are configured in a smaller diameter than engagement holes (37) formed in the second guide plate.

<Means for Attaining the Third Object>

To attain the above-mentioned object, in the invention, a plurality of diaphragm blades and a driving ring that opens and closes the blades are supported between first and second substrates each having a light-path aperture to enable open/close motion, the driving ring in the shape of a ring is provided with a cut portion recessed inside an open/close trajectory of a blade, and a passive tooth-form portion formed in the cut end face, and the passive tooth-form portion and a driving gear of the driving apparatus are meshed with each other. At this point, it is a feature that a second guide plate that backup-supports the blade in the cut portion is provided between the cut portion of the driving ring and the blade.

Further, the configuration will be described specifically. The configuration is provided with a pair of first and second substrates (11, 41) each having a light-path aperture (12), a plurality of diaphragm blades (21) disposed in the first substrate to adjust a quantity of passing light of the light-path aperture, a ring-shaped driving ring (31) that is disposed in the second substrate to be rotatable a predetermined rotation angle and that opens and closes the plurality of diaphragm blades, and driving means (M) that rotates and drives the driving ring.

The pair of substrates, the diaphragm blades, and the driving ring form a light-path aperture substantially at the center, and are overlaid in the order of the first substrate, diaphragm blades, driving ring and second substrate, the driving means is attached to the second substrate, and is comprised of a driving rotary shaft (52), a driving gear (53) that conveys rotation of the driving rotary shaft to the driving ring, the driving ring is provided with a cut portion (35) recessed inside an open/close trajectory of a blade, and a passive tooth-form portion (35g) formed in an end face of the cut portion to mesh with the driving gear, and a second guide plate (second slide ring 36 and cover member 39 described later), which backup-supports the blade to prevent the blade from sinking into the cut portion, is provided between the cut portion of the driving ring and the diaphragm blades.

EFFECT OF THE INVENTION

<Effect of the Means for Attaining the First Object>

In the invention, a plurality of diaphragm blades is supported on the substrate having a light-path aperture to be openable and closable via the first guide plate formed of a resin film, the protrusion formed in each of the diaphragm blades is fitted into the through hole of the first guide and the concave groove of the substrate, the through hole with a narrower width than that of the concave groove engages in the protrusion of the blade, and therefore, the following effects are exhibited.

A plurality of diaphragm blades is supported on the substrate to be openable and closable via the first guide plate formed of a resin film, and therefore, even when the substrate is formed of a material with a high coefficient of friction, it is possible to obtain smooth open/close motion of the blades. Accordingly, for example, when the substrate is manufactured by forming a resin with reinforcing fibers mixed and fibers protrude through the substrate surface, the blades do not directly come into contact with the substrate, and therefore, smooth motion of the blades is not prevented.

Further, in regulating motion of the protrusion formed in each diaphragm blade in the open/close direction by the guide grooves formed in the substrate and first guide plate, since the guide groove of the first guide plate is formed in a narrower width than the guide groove of the substrate and engages in the protrusion of the blade, the blade member is opened and closed along the guide groove of the first guide plate. Therefore, the guide groove of the substrate does not affect motion of the blade, and is thereby ease in manufacturing. Particularly, when the substrate is die-formed, it is possible to set the groove shape at an optional form such as a taper.

Concurrently therewith, since the guide groove of the substrate is formed of a concave groove, exterior light does not enter inside the light path from the guide groove formed along the trajectory of motion of the blade.

<Effect of the Means for Attaining the Second Object>

In the invention, further, the first guide plate is provided between the first substrate having a light-path aperture and the blades, the second guide plate is provided between the driving ring and the blades, the guide groove of the first guide plate that is fitted into the protrusion formed in each blade is configured in a narrower width than the guide groove of the first substrate, the fit holes of the driving ring are configured in a smaller diameter than fit holes of the second guide plate, and therefore, the following effects are exhibited.

Since a plurality of diaphragm blades is supported on the first substrate (base plate) to be openable and closable via the first guide plate, when the substrate is configured to be robust by metal forming, resin forming or the like, it does not happen that the load on blade open/close is increased by the effect of surface roughness, burr, mixed material (for example, reinforcing fibers) and the like. Concurrently therewith, a plurality of blade members is supported at their surfaces (upper surfaces) on the opposite side to the first substrate by the driving ring, the second guide plate is provided between the blades and the driving ring to support the blades to be openable and closable, and therefore, when the driving ring is formed by metal forming, resin forming or the like, smooth open/close action is permitted without undergoing the effect of surface roughness, burr, mixed material and the like.

Concurrently therewith, in regulating motion of the protrusion formed in each blade member by the guide grooves formed in the first substrate and first guide plate, since the guide groove on the plate side is formed in a narrower width than the guide groove on the substrate side, the blade member performs open/close motion along the guide groove on the plate side. Therefore, the guide groove of the first substrate does not affect open/close motion of the blade, for example, when cut tapers are formed in die-forming or processing accuracy is made rough.

Further, the second protrusion is formed in each blade member, and is coupled with the fit holes provided in the driving ring and second guide plate, and motion of the driving ring is conveyed to the blade. At this point, since the fit hole on the driving ring side is made a smaller diameter than that on the guide plate side, even when fit holes on the ring side and plate side are misaligned, or mutually have dimension errors, the blades are regulated by the driving ring, and shift to be opened and closed by the same amount corresponding to a shift of the driving ring without undergoing the effect of the guide plate.

<Effect of the Means for Attaining the Third Object>

In the invention, furthermore, a plurality of diaphragm blades and the driving ring that opens and closes the blades are supported between first and second substrates each having a light-path aperture, the driving ring is provided with the cut portion recessed inside the open/close trajectory of the blade, the passive tooth-form portion is formed in the cut end face, the second guide plate that backup-supports the blades is provided between the cut portion of the driving ring and the blades when the passive tooth-form portion and the driving gear of the driving apparatus mesh with each, and therefore, the following effects are exhibited.

The driving ring is provided with the passive tooth-form portion that meshes with the driving gear in the cut portion recessed inside the open/close trajectory of the blade, and it is thereby possible to make the driving ring a small diameter inside the open/close trajectory of a plurality of blades. By this means, it is possible to reduce friction between a plurality of diaphragm blades disposed around the light-path aperture to be openable and closable and the driving ring, and it is possible to make the driving apparatus that opens and closes the blades small in size and low power consumption.

Further, in the cut portion formed in the driving ring, the second guide plate for preventing the blade from sinking is disposed to backup-support the blades, and therefore, the end portion of the blade does not sink into the cut concave portion and thereby does not warp. By this means, floating of the front end portion of the blade due to warping of the blade does not occur, the blade base end portion does not fail to engage in the motion regulation guide (guide groove, or the like), and the blades are allowed to perform smooth open/close action.

Concurrently therewith, it is possible to make a plurality of diaphragm blades thin and light weight by punching forming using a resin sheet or the like, and warping of the blade due to forming does not occur.

Further, in the invention, the second guide plate is in the shape of a plate made of a resin, metal or the like, and is provided between the blades and the driving ring, and therefore, the blades and the driving ring do not come into contact with each other directly. By this means, for example, when the driving ring is formed by press forming using a metal plate, motion of the blades is not inhibited by the effect of a burr and the like.

DETAILED DESCRIPTION OF PREFERRED EMBODIMENT

Figure 1:
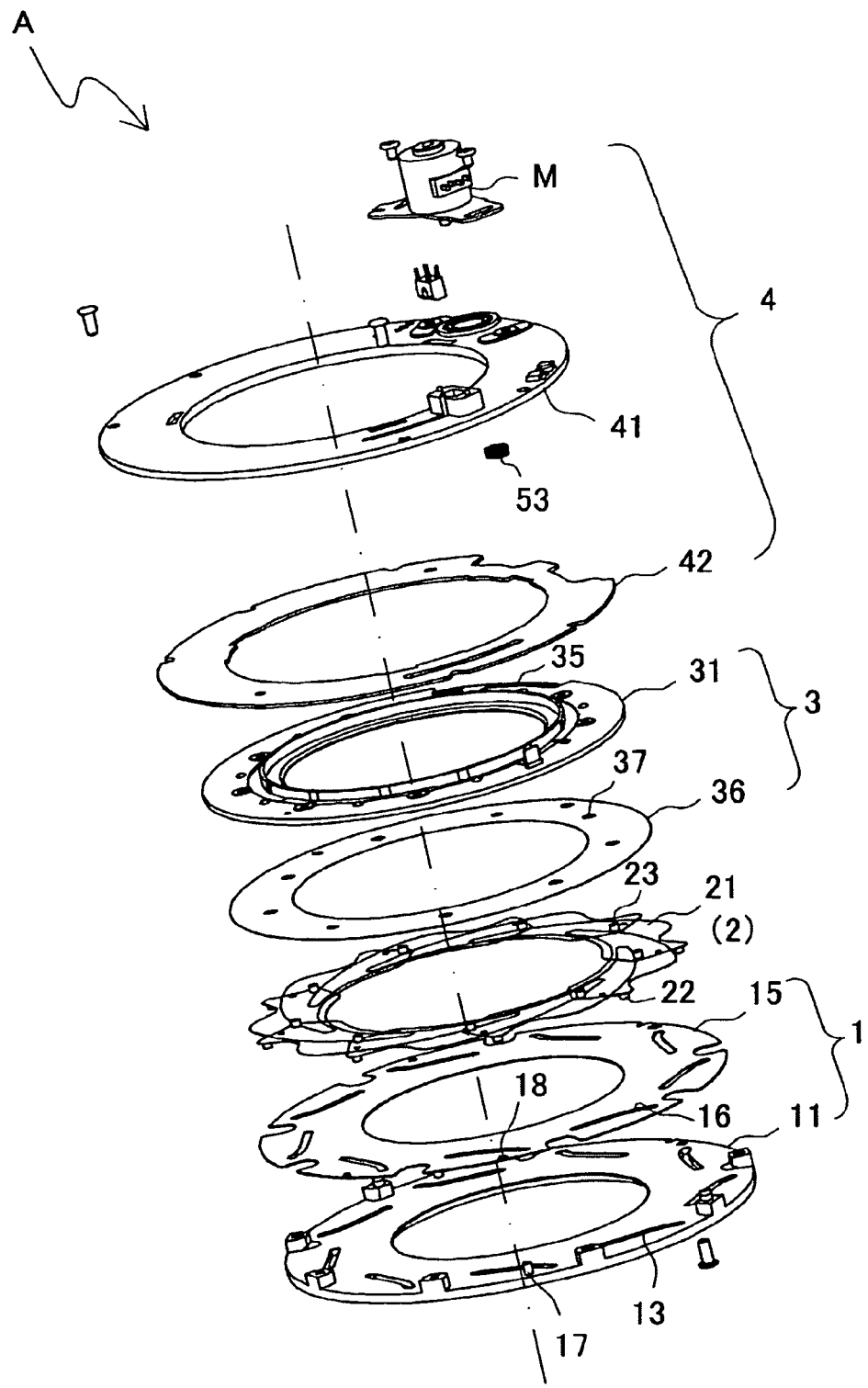
FIG. 1 is an exploded view of a light quantity adjustment apparatus according to the invention.

The present invention will be described below based on preferred Embodiments shown in the figures. FIG. 1 is an exploded view of a light quantity adjustment apparatus A according to the invention. As shown in FIG. 1, the light quantity adjustment apparatus A is comprised of a first substrate set (base plate set) 1, blade set 2, driving ring set 3, and second substrate set 4 (hold plate set). Then, the blade set 2 is installed into the first substrate set 1, and the driving ring set 3 and second substrate set 4 are installed onto the blade set 2. By such a configuration, the blade set 2 is held between the first substrate set 1 and the second substrate set 4 in the shape of a sandwich, and the first and second substrates are integrated (not shown) with fixing screws.

[Configuration of the First Substrate Set]

The configurations of the first substrate set 1 and blade set 2 will be described according to FIG. 2. The first substrate set 1 is comprised of a base plate 11 and a first slide ring 15 (first guide plate; the same in the following description), and the blade set 2 is comprised of a plurality of diaphragm blades 21. Each configuration will be described.

The base plate 11 regulates the diameter (maximum diameter) of a light-path aperture 12, while supporting the plurality of diaphragm blades 21 that open and close the light-path diameter to be openable and closable. Further, the first slide ring 15 is provided between the base plate 11 and the diaphragm blades 21, prevents the base plate 11 and blades from directly coming into contact with each other, and obtains smooth slide of the blades.

Figure 2:
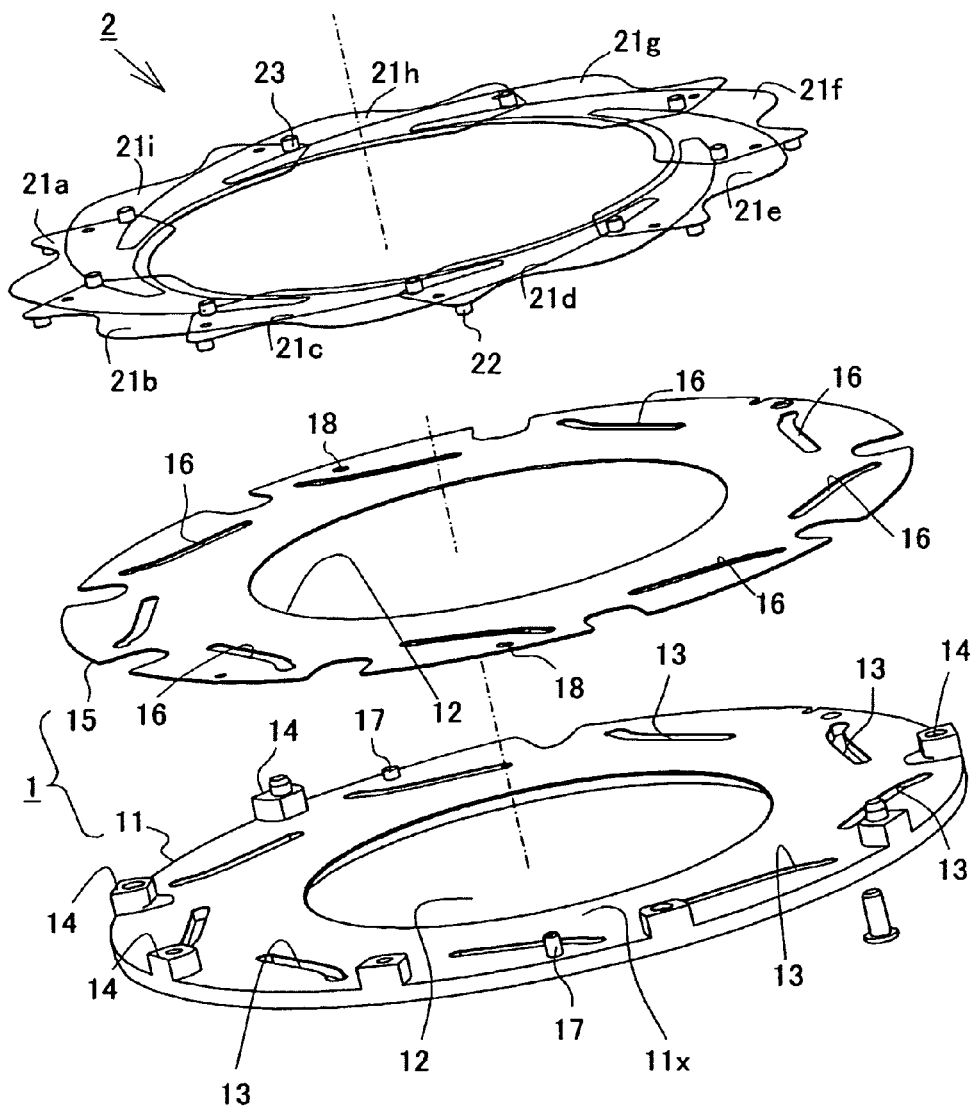
FIG. 2 is a perspective explanatory view of an assembly exploded state of a first substrate (base plate) and blades in the apparatus of FIG. 1.
Figure 4A:
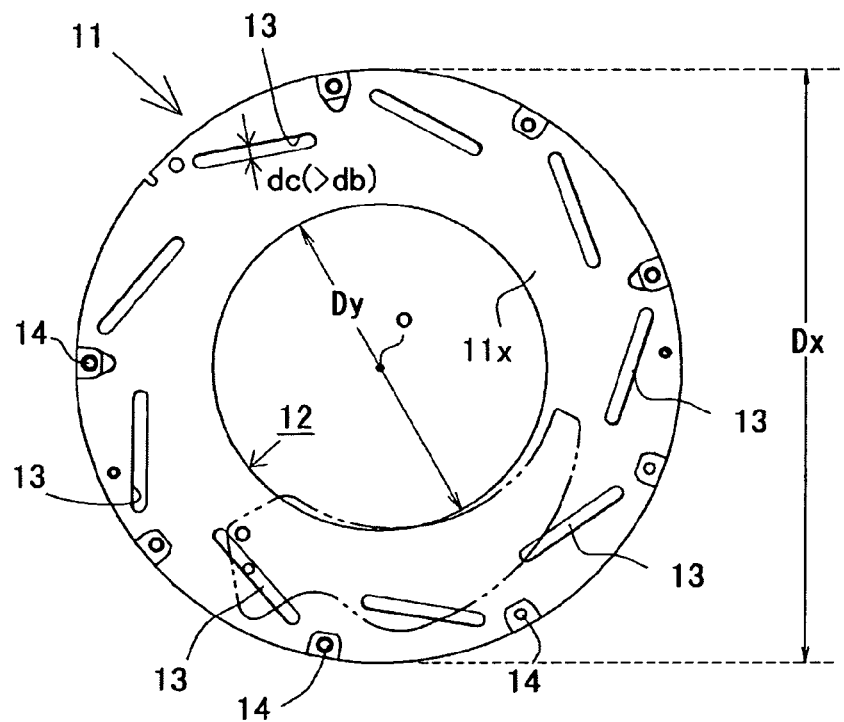
FIG. 4A shows a planar state of each component in the apparatus of FIG. 1 and shows the first substrate (base plate)

Further, as shown in FIG. 2 showing the perspective shape and in FIG. 4A showing the planar shape, the base plate 11 is formed in the shape of a ring having the light-path aperture 12. The outside diameter Dx of the base plate 11 is set to adapt to the barrel shape of an image pickup apparatus, and the diameter Dy of the light-path aperture 12 is set to agree with the diameter of the light path of the image pickup apparatus.

Furthermore, the base plate 11 is formed of a material such as metal and resin in dimensions to provide the diaphragm apparatus with toughness. Particularly, the base plate 11 shown in the figure is formed by mold forming using a synthetic resin with reinforcing fibers such as glass fibers mixed thereinto. This is because of making the base plate 11 thin, small-size and light weight, while grounding static electricity generated in the diaphragm blades 21 and the first slide ring 15.

As described above, the base plate 11 provided with the light-path aperture 12 in the center portion is provided with a blade support surface 11x that supports the diaphragm blades around the aperture, and the diaphragm blades 21 are supported on the support surface via the first slide ring 15, described later. Therefore, the blade support surface 11x is formed of a flat plane or a ring-shaped concavo-convex surface with the center of the light path as the center. Further, in the blade support surface 11x are formed guide grooves 13 that guide (regulate motion of) the diaphragm blades 21 in the open/close direction. The configuration of the guide grooves 13 will be described later. "14" shown in the figure denotes a coupling protrusion that secures a hold plate 41, and a screw hole is formed inside the protrusion.

[First Guide Plate]

Figure 4B:
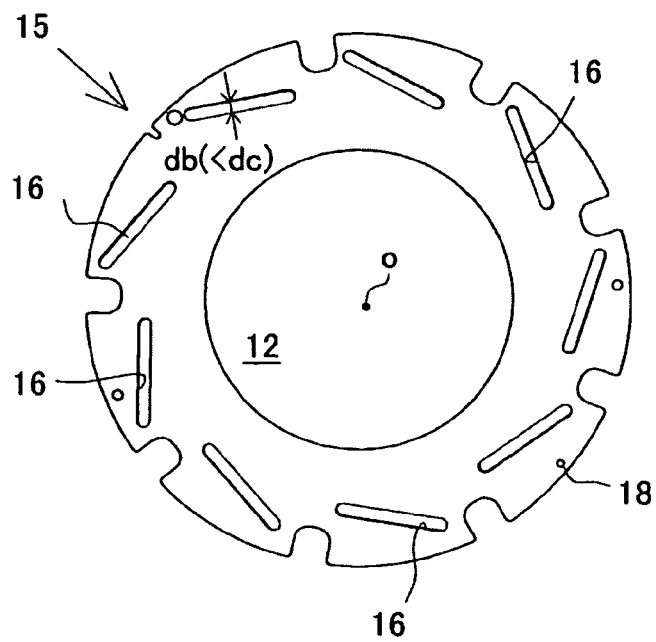
FIG. 4B shows a planar state of each component in the apparatus of FIG. 1 and shows a first guide plate (first slide ring)
Figure 7A:
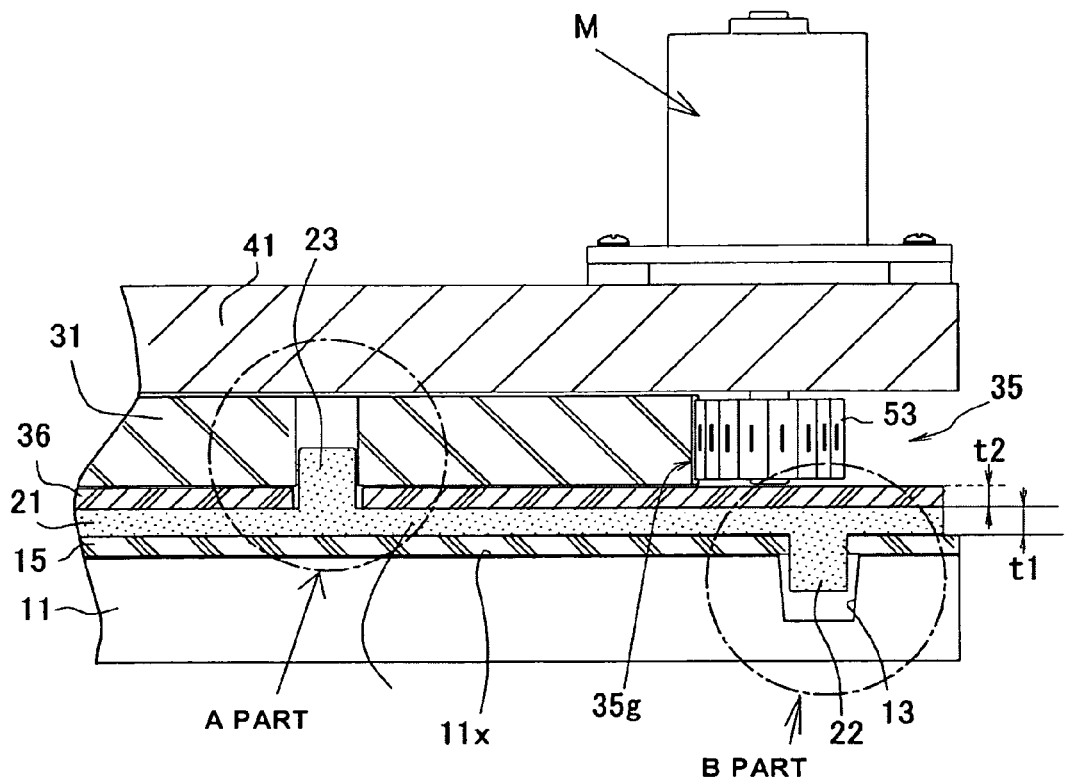
FIG. 7A is an explanatory view of an assembly state of the substrate, blade, and driving ring in the apparatus of FIG. 1, and is a sectional view thereof.

As shown in FIG. 2 showing the perspective structure and in FIG. 4B showing the planar structure, the first guide plate (first slide ring) 15 is formed in the shape of a ring that is approximately the same shape as the base plate 11. As shown in FIG. 7A showing the sectional structure, the first guide plate 15 is provided between the blade support surface 11x of the base plate 11 and the diaphragm blades 21, and prevents the blades 21 from directly coming into contact with the base plate 11. The first guide plate 15 shown in the figure is formed approximately in the same planar shape as the base plate 11.

The first guide plate 15 is formed of a resin film with a low coefficient of frictions with respect to the blade members 21, described later. The first guide plate 15 shown in the figure is made of the same material as the diaphragm blades 21, described later, and for example, is formed by die-cutting of a polyethylene resin film (PET sheet). Then, as the shape is shown in FIG. 4B, the plate 15 is provided with guide grooves 16 coincident with the guide grooves 13 of the base plate 11. The guide grooves 16 will be described later.

Accordingly, when the base plate 11 is formed by mold forming using a resin, and the first guide plate 15 is formed by die-cutting forming using a resin film, it is possible to form the first guide plate 15 with a high degree of shape accuracy as compared with shape accuracy of the base plate 11. This is because dimension accuracy is obtained by performing die-cutting forming on a material formed in the shape of a sheet by calendering-roll forming, as compared with mold forming. Further, by making the material of the first guide plate 15 the same as the material of the diaphragm blades 21, temperature characteristics such as a thermal change are substantially the same as the blade members, the blades 21 and guide plate 15 are of the same material and have the same electrification rank, and therefore, static electricity is not charged when both of the members slide.

Figure 8A:
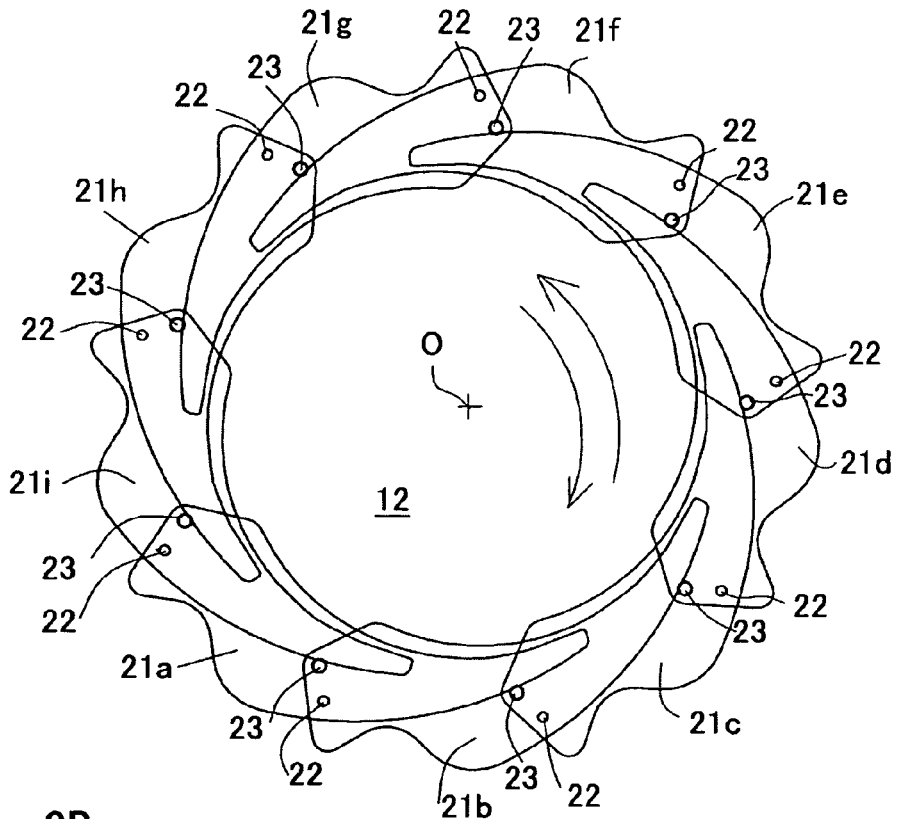
FIG. 8A shows an open/close state of the diaphragm blades in the apparatus of FIG. 1, and is an explanatory view showing a combination state of the diaphragm blades.
Figure 8B:
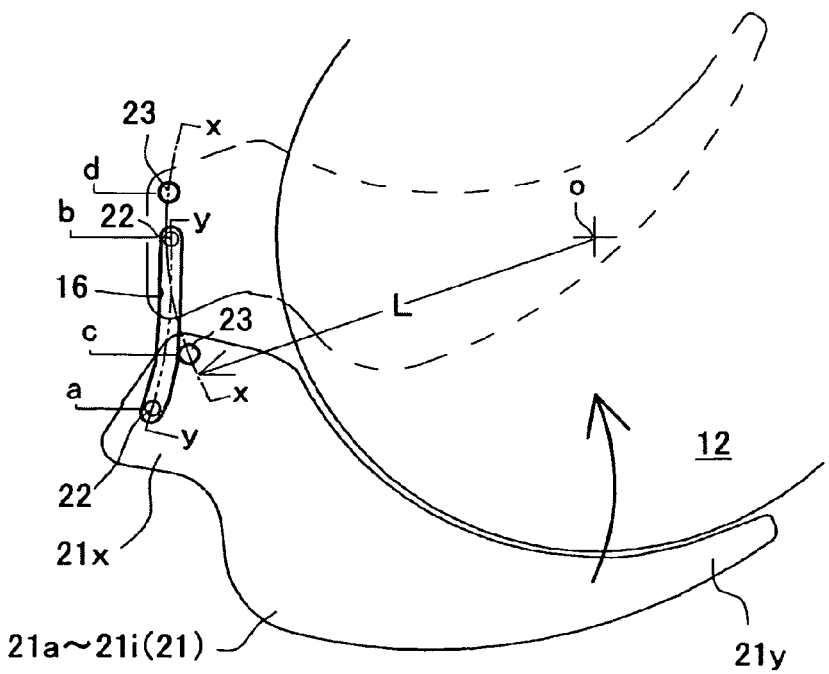
FIG. 8B shows the open/close state of the diaphragm blades in the apparatus of FIG. 1, and is an explanatory view showing the open/close trajectory of the blade.

The first guide plate 15 shown in the figure is formed approximately in the same shape as the base plate 11, supports base end portions 21x of a plurality of diaphragm blades 21 around the light-path aperture 12 positioned at the center, and supports the front end portions 21y to face the inside of the light-path aperture (see FIGS. 8A and 8B).

[Blade Member]

As shown in FIGS. 8A and 8B, the blade set 2 is comprised of a plurality of diaphragm blades 21a to 21i. The diaphragm blades 21 shown in the figure are comprised of nine blades, and the shape of each blade is formed in the same shape. FIG. 8B shows an example of the blade shape, and the base end portion 21x is supported by the base plate 11 via the above-mentioned first slide ring 15. Further, the front end portion 21y of the blade opens and closes the light-path aperture 12. At this point, the front end portions 21x of a plurality of blade members overlap one another in the shape of scales, and are in the shape of forming the circular light-path diameter 12.

As shown in FIG. 8A, in each of the blade members 21a to 21i, a first protrusion (guide pin) 22 and second protrusion (operating pin) 23 are planted in the front and back sides. The guide pin 22 is disposed in a position facing the base plate 11 side in each blade member, and the operating pin 23 is disposed in the opposite surface (the second substrate side, described later). The guide pin 22 is fitted into the guide groove 13 of the base plate 11, and the guide groove 16 of the first guide plate 15, as described later, and the operating pin 23 is fitted into a fit hole 33 of a driving ring 31, described later. In addition, each of the blade members 21a to 21i is provided with poisoning holes (not shown) used in planting (for example, fusion-bonding) the first and second protrusions 22, 23, and the planting positions of the first and second protrusions 22, 23 are set using the outside shape of the blade and the positioning holes.

[Relationship Between the Guide Groove and the Guide Pin]

Described next is the relationship between the guide groove 13 formed in the above-mentioned base plate 11 and the guide groove 16 formed in the first guide plate 15, and the guide pin (first protrusion) 22 formed in each blade member 21.

Figure 7B:
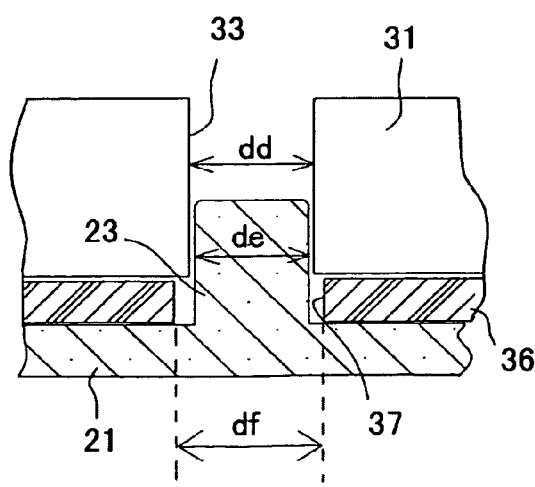
FIG. 7B is another explanatory view of the assembly state of the substrate, blade, and driving ring in the apparatus of FIG. 1, and is an enlarged view of A part of FIG. 7A.
Figure 7C:
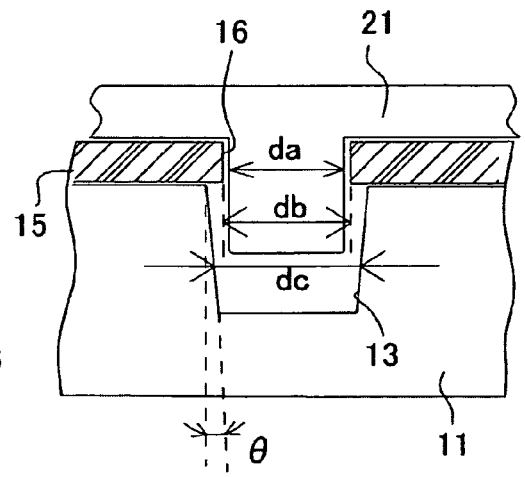
FIG. 7C is still another explanatory view of the assembly state of the substrate, blade, and driving ring in the apparatus of FIG. 1, and is an enlarged view of B part of FIG. 7A.

As shown in FIGS. 7A and 7C, the guide groove 13 of the base plate 11 is comprised of a concave groove and is formed in the shape of a blind hole through which light outside the base plate is not transmitted. Further, in relation to the fact that base plate 11 is formed by mold forming, a cutting taper θ is formed, and the average inside diameter is set at dc.

Further, the guide groove 16 of the first guide plate 15 is formed of a through hole with the inside diameter of db. The through hole is formed in a uniform diameter by die-cutting forming using a resin film.

Meanwhile, the guide pin 22 is planted in each of the diaphragm blades 21a to 21i, and the outside diameter of the pin is set at da. Then, the relationship between the pin outside diameter da and the guide groove inside diameter db is set at the relationship of da≤db<dc. In other words, the guide groove 16 of the first guide plate 15 has a narrower width (db<dc) than that of the guide groove 13 of the base plate 11, and is set at a dimension adapted to the guide pin outside diameter da (da≤db).

Accordingly, as shown in the figures, the guide pin (first protrusion) 22 plated in each of the blade members 21a to 21i engages in the guide groove 16 of the first guide plate 15, is regulated in motion, and does not come into contact with the guide groove 13 of the base plate 11. Therefore, it does not happen that the guide pin (first protrusion) 22 engages in the guide groove 13 of the base plate 11 having the taper θ unstably. By this means, the blade members 21 are neither inclined nor float.

[Configuration of the Second Substrate Set]

The second substrate set 4 and driving ring set 3 will be described according to FIG. 3. The substrate set 4 is comprised of the hold plate 41, a reinforcing plate 42 and a driving unit M secured to the hold plate. Further, the driving ring set 3 is comprised of a driving ring 31, and second slide ring (second guide plate) 36. Each configuration will be described below.

[Hold Plate]

Figure 3:
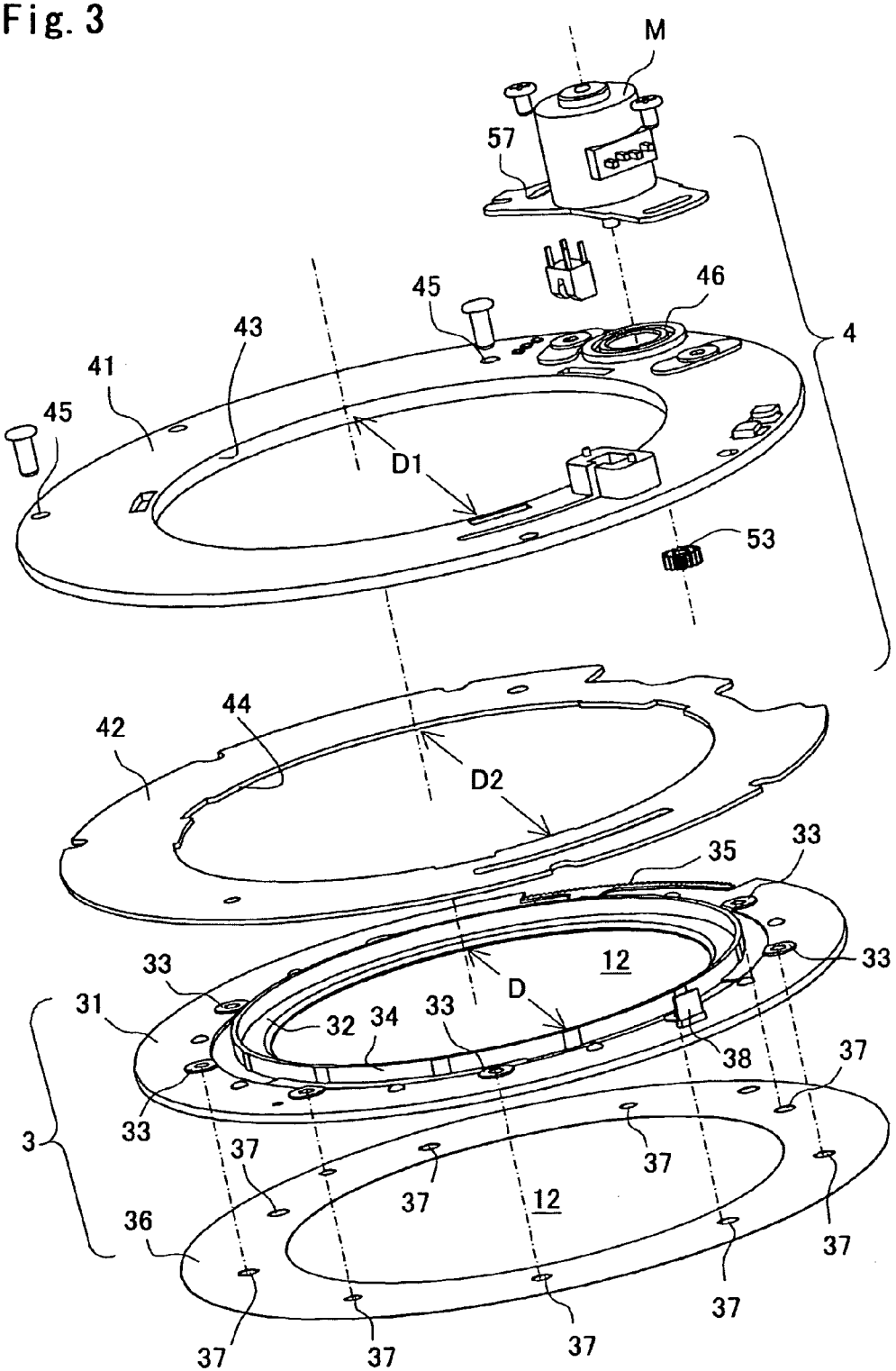
FIG. 3 is a perspective explanatory view of an assembly exploded state of a second substrate (hold plate) and blades in the apparatus of FIG. 1.

As shown in FIG. 3, the hold plate 41 is formed in the shape of a ring having an aperture 43 in the center portion, and is formed approximately in the same shape as the above-mentioned base plate 11. The hold plate 41 shown in the figure is of mold forming using a resin, and a mount 46 of the driving unit M is provided in part of the outer region. In the mount 46, the driving unit M, described later, is fastened with screws or the like. "45" shown in the figure denotes a coupling hole to fasten the hold plate 41 to a coupling protrusion 14 of the base plate 11 with a screw.

[Reinforcing Plate]

As shown in FIG. 3, the reinforcing plate 42 is comprised of a relatively strong plate material such as metal, and reinforces the hold plate 41 made of a resin. Accordingly, when sufficient strength is obtained in the hold plate 41, it is possible to eliminate the reinforcing plate 42. The reinforcing plate 42 is formed approximately in the same shape as the hold plate 41, and an aperture 44 is formed at the center.

Each of the aperture 43 of the hold plate 41 and the aperture 44 of the reinforcing 42 is set to be larger than the aperture diameter D of the light-path aperture 12, and the aperture diameter D1 of the aperture 43, the aperture diameter D2 of the aperture 44 and the aperture diameter D of the light-path aperture 12 are set at D2≥D1>D.

The driving ring set 3 is comprised of the driving ring 31 that conveys driving of the driving motor (driving unit, described later) M to the diaphragm blades 21, and the second slide ring (second guide plate) 36.

[Driving Ring]

As shown in FIG. 3, the driving ring 31 is formed in the shape of a ring (hereinafter, referred to as the "driving ring") having the light-path aperture 12 in the center portion, for example, by mold forming using a resin. The driving ring 31 is attached rotatably to the hold plate 41 via the reinforcing plate 42. Therefore, in the driving ring 31, a fringe 32 and engagement protrusion 34 are formed around the light-path aperture 12. The fringe 32 is fitted into the aperture 43 of the hold plate 41 and the aperture 44 of the reinforcing plate 42, and rotates about the rotation center coinciding with the center of the light-path aperture 12. Further, the engagement protrusion 34 is formed on the surface that comes into slide-contact with the reinforcing plate 42, and helps both members to slide smoothly.

The driving ring 31 is incorporated into the hold plate 41 to be rotatable as described above, and passive teeth 35 are formed in part of the circumference. The passive teeth 35 are provided in a position to mesh with a driving gear 53 of the driving unit M, described later, attached to the mount 46 of the hold plate 41.

In the driving ring 31, a fit hole 33 that is fitted into the operating pin (second protrusion) 23 planted in each of the diaphragm blades 21a to 21i is provided around the light-path aperture 12. The fit hole 33 is disposed in a plurality of portions (in the figure, nine portions) around the light-path aperture 12 corresponding to the number of diaphragm blades 21.

In such a configuration, the driving ring 31 is supported by the hold plate 41 rotatably, and rotates a predetermined angle by the driving gear 53 of the driving unit M. Then, rotation of the driving ring 31 is conveyed to each of the blade members 21a to 21i.

Further, a shift position detection hook 38 is formed in the driving ring 31, and it is configured that in a beforehand set creation position (for example, a home position) of the driving ring 31, the shift position detection hook 38 interrupts light incident from a light emitting portion to a light receiving portion of a driving ring shift position detection sensor SE that is integrally formed and provided in the hold plate 41, and that it is thereby possible to detect that the driving ring 31 exists in the beforehand set certain position (for example, home position).

[Second Guide Plate]

Figure 5A:
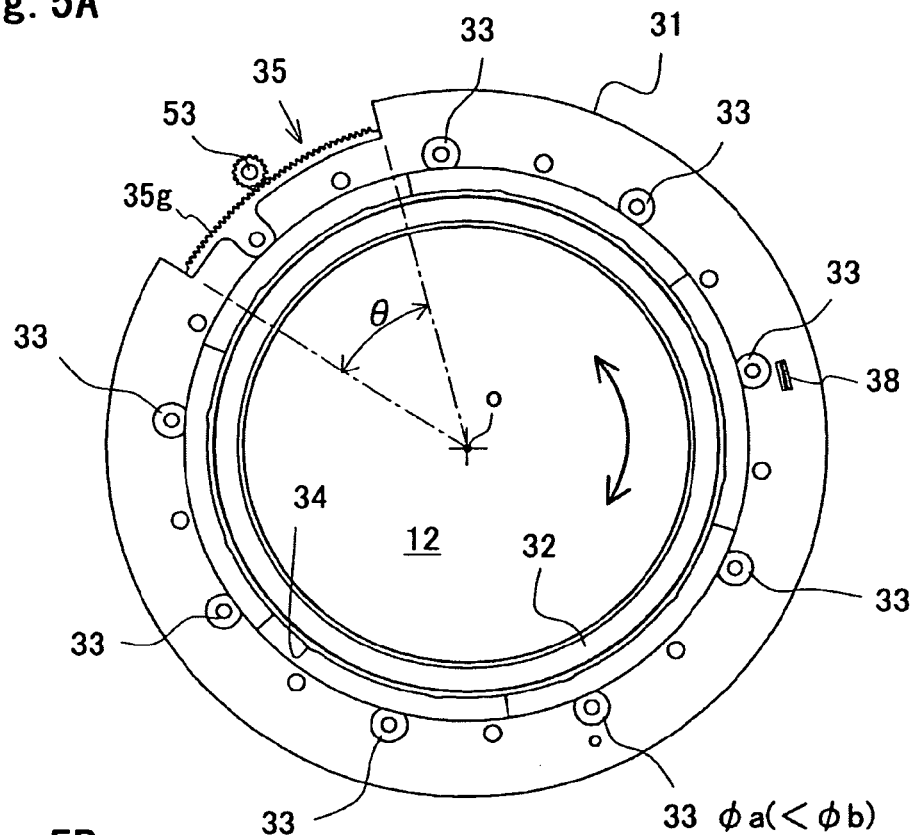
FIG. 5A shows a planar state of each component in the apparatus of FIG. 1 and shows a driving ring.
Figure 5B:
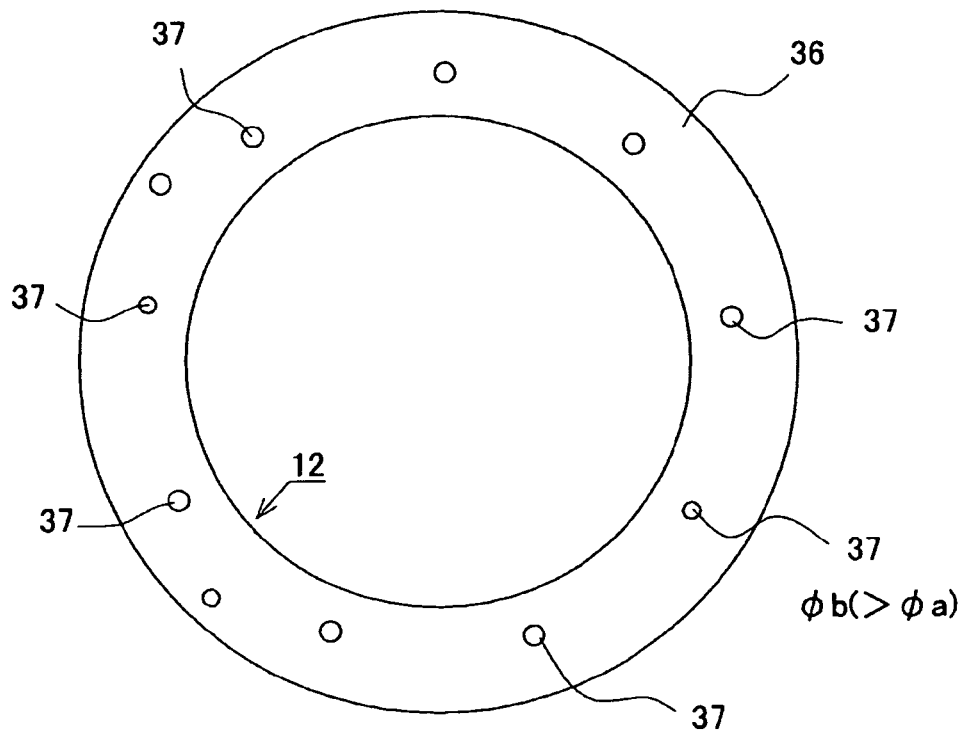
FIG. 5B shows a planar state of each component in the apparatus of FIG. 1 and shows a second guide plate (second slide ring)
Figure 6A:
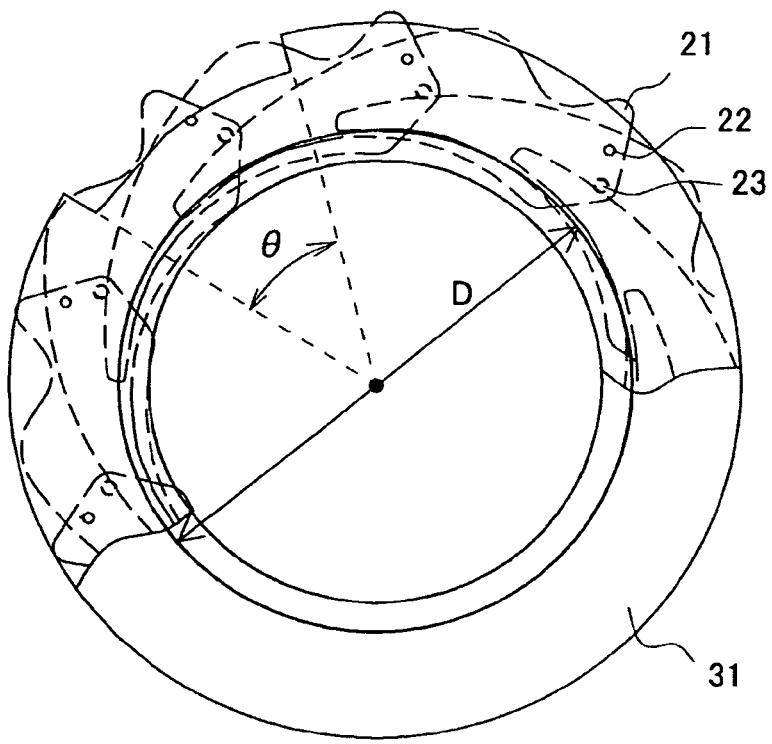
FIG. 6A shows an open/close state of the diaphragm blades and the driving ring in the apparatus of FIG. 1, and is an explanatory view showing a combination state of the diaphragm blades.
Figure 6B:
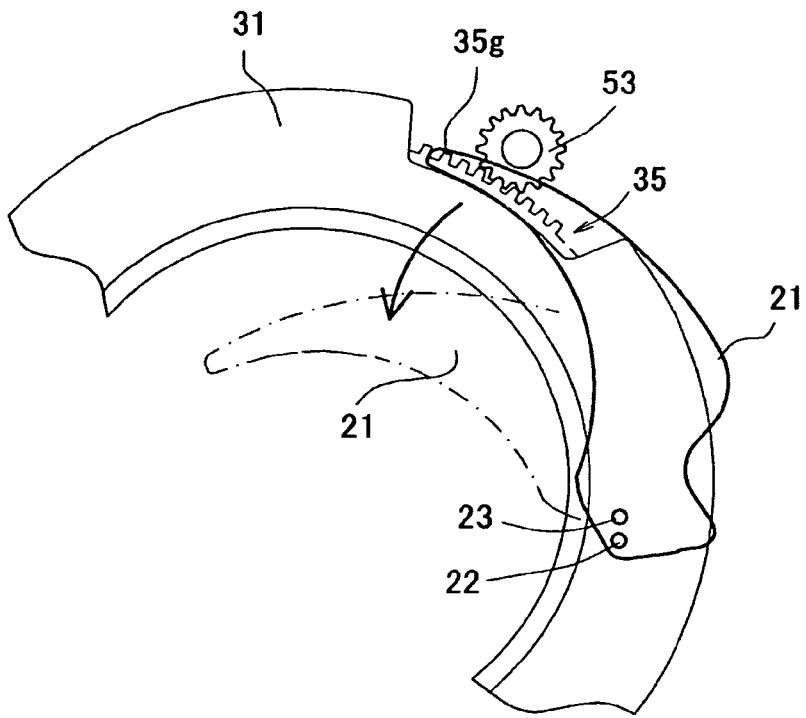
FIG. 6B shows the open/close state of the diaphragm blades and the driving ring in the apparatus of FIG. 1, and is an explanatory view showing the relationship between the open/close trajectory of a blade and the driving ring.

With respect to the second guide plate (second slide ring; the same in the following description) 36, FIG. 3 shows a perspective view, FIG. 5B shows a planar shape, and FIG. 6A shows a section shape. As shown in FIGS. 3 and 5B, the plate 36 is formed of a resin film (for example, a resin film of polyethylene or the like) having the light-path aperture 12 at the center, and is provided between the driving ring 31 and blade members 21. This is because of preventing the blade members 21 and driving ring 31 from directly coming into contact with each other, and obtaining smooth open/close motion of the diaphragm blades. The second guide plate 36 shown in the figure is made of the same material as the diaphragm blades 21. This is because by thus using the same material in the blades and slide ring that mutually slide, temperature characteristics such as a thermal change are substantially the same as the blade members, the blades and slide ring are of the same material and have the same electrification rank, and therefore, static electricity is not charged when both of the members slide.

Further, as shown in FIG. 6A, the thickness t2 of the slide ring 36 and the thickness t1 of the blade are set at t1>t2. Thus, in the slide ring 36, a cut concave portion 35 is disposed in a concave shape inside the open/close trajectory of the blade, and the second slid ring 36 is disposed to cover the cut concave portion 35. This is because of preventing the blade member 21 from sinking inside the cut concave portion 35 and the blade from warping. Therefore, the second slide ring 36 is at least in the shape of covering the cut concave portion 35 of the driving ring 31 and is disposed in the position.

The second guide plate 36 is formed in the shape of a ring similar to the driving ring 31. In the second guide plate 36, engagement holes 37 are provided in positions coincident with the fit holes 33 of the driving ring 31. In the fit hole 33 of the driving ring 31 and the engagement hole 37 of the slide ring, as shown in FIG. 7B, the relationship in the outside diameter de of the second protrusion (operating pin) 23 formed in each blade, the diameter dd of the fit hole 33 of the driving ring 31, and the diameter df of the engagement hole 37 of the second guide plate 36 is set as the following equation.

$$de \leq dd < df \tag{Eq.1}$$

In other words, the outside diameter de of the operating pin (second protrusion) 23 of the blade and the diameter dd of the fit hole 33 of the driving ring 31 are fitted to be mutually adapted, and the diameter df of the engagement hole 37 of the second guide plate 36 is set to be sufficiently larger than the outside diameter de of the operating pin (second protrusion) 23. By this means, the operating pin (second protrusion) 23 of the blade is substantially fitted into the engagement hole 33 of the driving ring 31, and does not engage in the engagement hole 37 of the second guide plate 36.

Figure 11A:
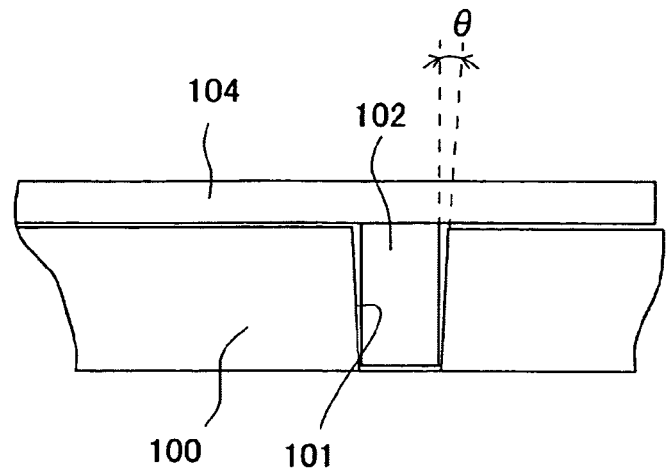
FIG. 11A is an explanatory view of a first problem of a blade open/close mechanism provided with a driving ring and guide plate, and is a view showing a sectional structure thereof.
Figure 11B:
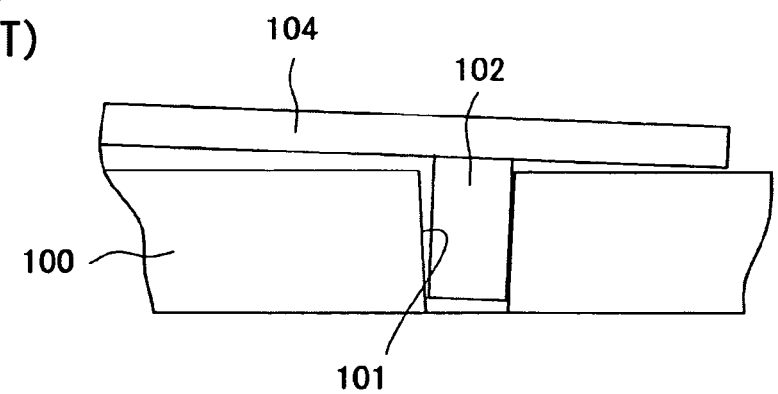
FIG. 11B is another explanatory view of the first problem of the blade open/close mechanism provided with the driving ring and guide plate, and is an enlarged explanatory view of first principal part.
Figure 11C:
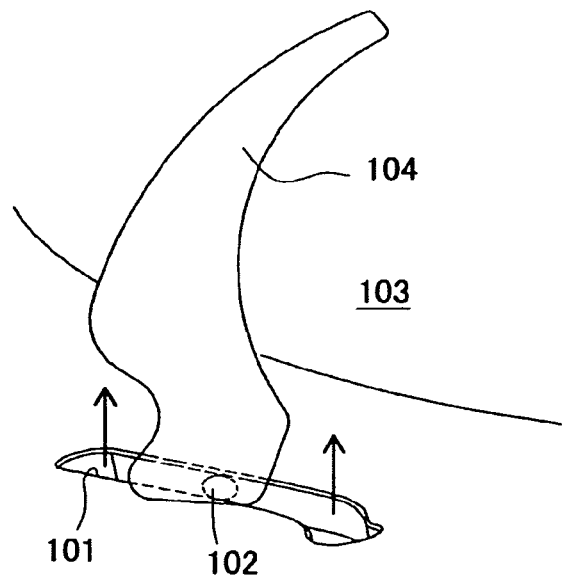
FIG. 11C is still another explanatory view of the first problem of the blade open/close mechanism provided with the driving ring and guide plate, and is an enlarged explanatory view of second principal part.
Figure 12A:
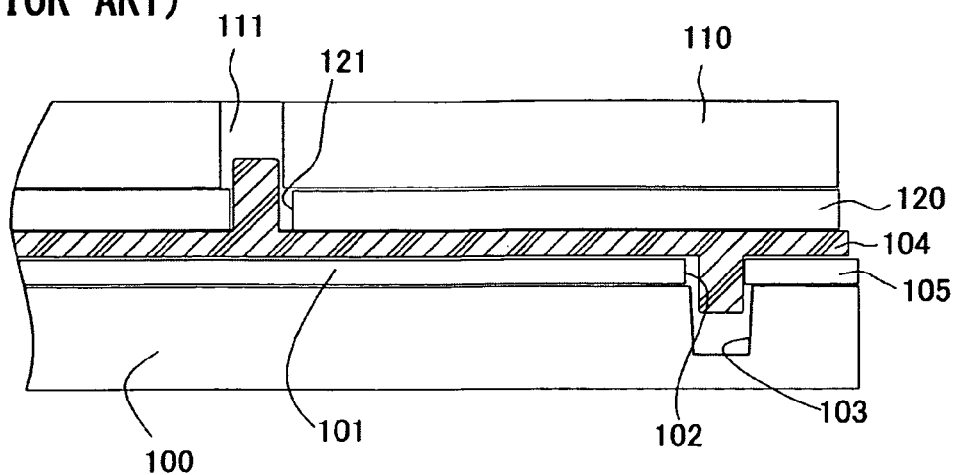
FIG. 12A is an explanatory view of a second problem of a similar blade open/close mechanism, and is a view showing a sectional structure thereof.
Figure 12B:
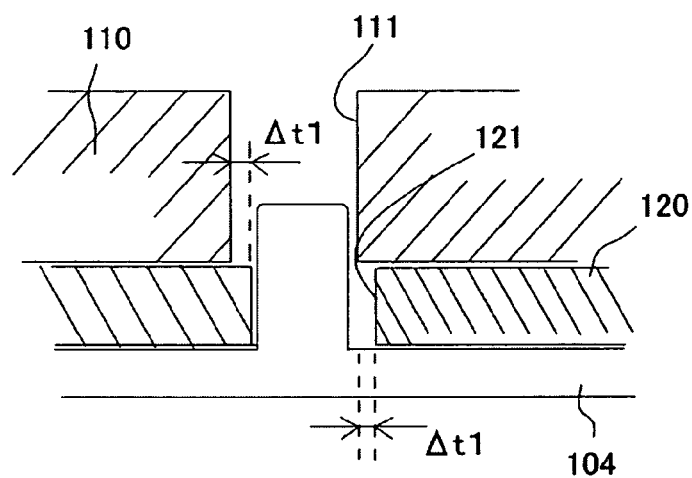
FIG. 12B is another explanatory view of the second problem of the similar blade open/close mechanism, and is an enlarged explanatory view of first principal part.
Figure 12C:
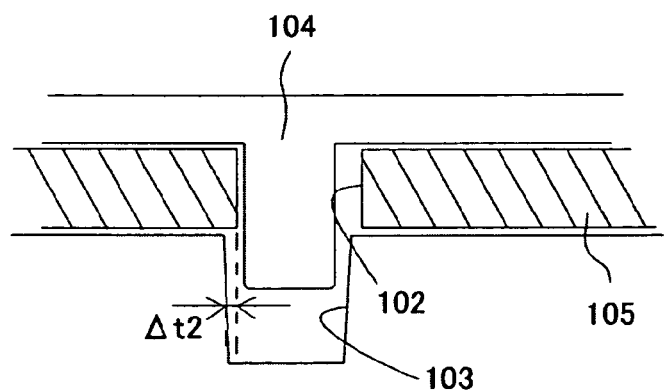
FIG. 12C is still another explanatory view of the second problem of the similar blade open/close mechanism, and is an enlarged explanatory view of second principal part.
Figure 13A:
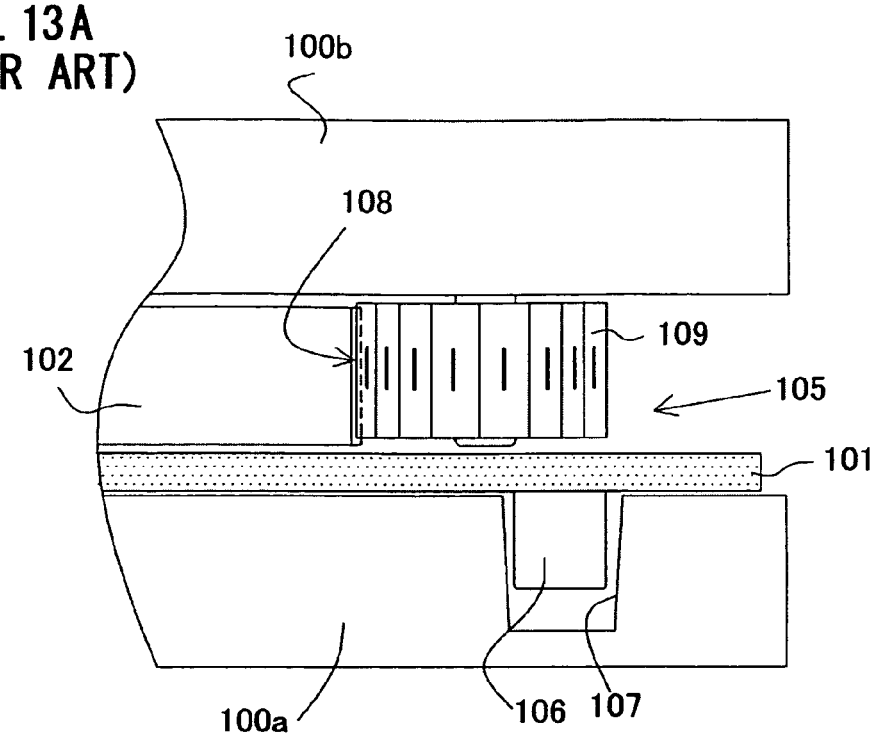
FIG. 13A is an explanatory view of a third problem of a similar blade open/close mechanism, and is an explanatory view showing a structure of the blade open/close mechanism.
Figure 13B:
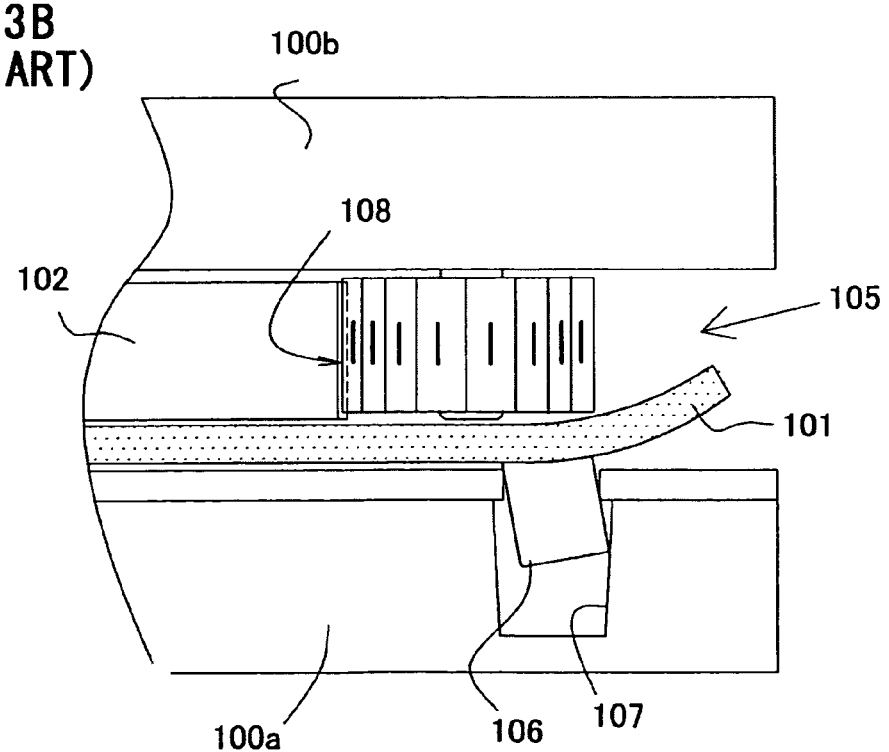
FIG. 13B is another explanatory view of the third problem of the similar blade open/close mechanism, and is a state explanatory view showing a state in which the blade warps.

Described below is the reason that the fit hole 33 (diameter dd) of the driving ring 31 is thus set at a diameter smaller than the engagement hole 37 (diameter df) of the second guide plate 36. The second guide plate 36 exists between the driving ring 31 the blades 21. Therefore, the second guide plate 36 also performs rotation motion by open/close motion of the blades 21 or rotation motion of the driving ring 31. At this point, when the engagement hole 37 of the second guide plate 36 and the fit hole 33 of the driving ring 31 are misaligned or the hole diameter differs by processing accuracy, as shown in FIG. 11B, a phase difference Δt1 occurs between engagement holes. The phase difference affects open and close of blades as a backlash.

When such a backlash (phase difference Δt1) exists, in a plurality of diaphragm blades, some blade rotates faster by Δt1, while another blade rotates slower by Δt1. Then, open/close misalignment occurs in the front ends of the blades. Therefore, in the invention, the hole diameters are set so that the engagement hole 37 of the second guide plate 36 is set to be larger than the fit hole 33 of the driving ring 31, and does not engage in the operating pin (second protrusion) 23 of the blade.

[Different Embodiment of the Guide Member]

Figure 7D:
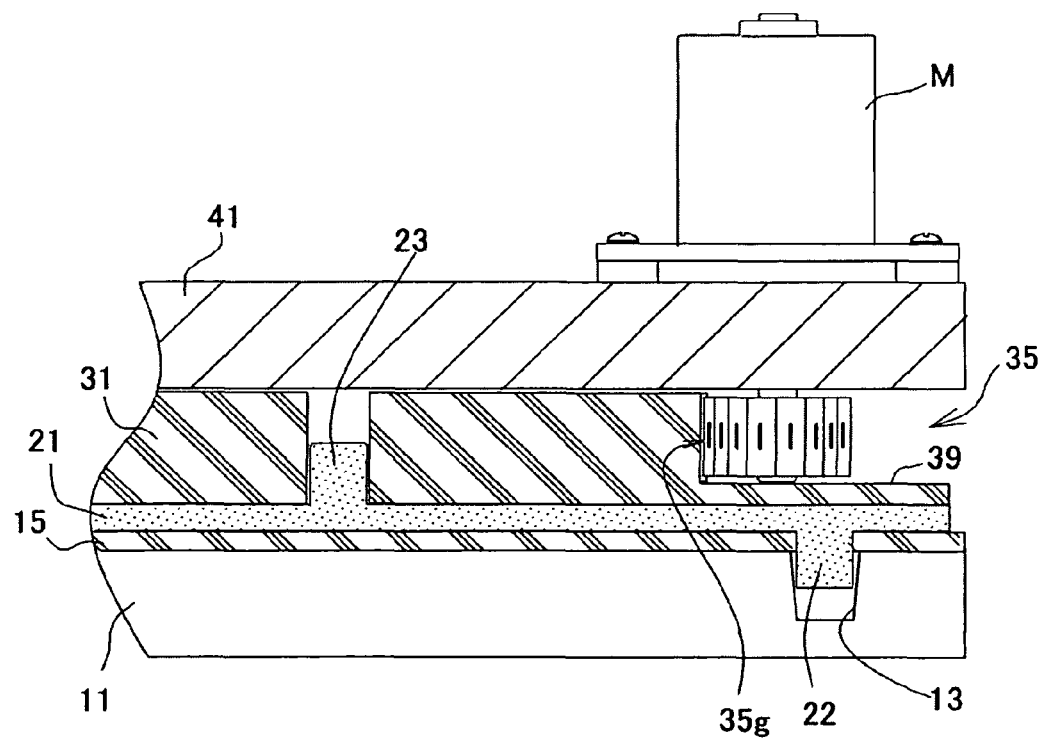
FIG. 7D shows another Embodiment of FIG. 7A, is an explanatory view of the assembly state of the substrate, blade, and driving ring in the apparatus of FIG. 1, and is a sectional view thereof.

FIG. 7D shows a different Embodiment of the guide member that is the second guide plate, and the same components as in the above-mentioned Embodiment are assigned the same reference numerals to omit descriptions thereof. The cut concave portion 35 of the driving ring 31 is provided with a cover member 39 that backup-supports the diaphragm blades 21. The cover member 39 shown in the figure is integrally formed in the driving ring 31. Alternatively, the member 39 may be formed of a resin film piece or the like and bonded to the driving ring 31 with an adhesive.

[Driving Unit M]

Figure 9:
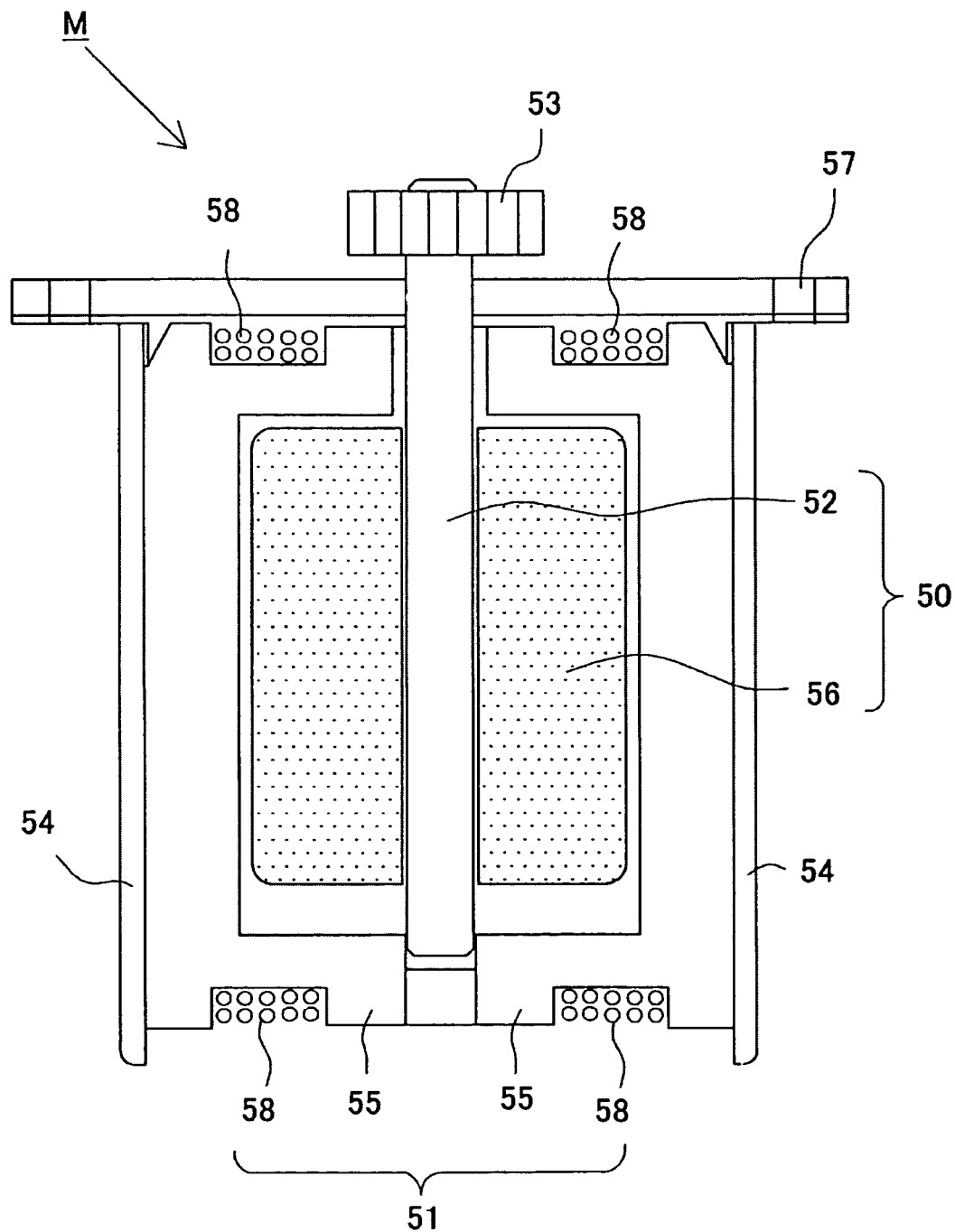
FIG. 9 is an explanatory view of an electromagnetic driving unit in the apparatus of FIG. 1.

FIG. 9 shows an Embodiment of the driving unit M. The driving unit M in FIG. 9 is comprised of a magnet rotor 50, stator coil 51, driving rotary shaft 52, driving gear 53, and yoke 54. The magnet rotor 50 is configured by integrating the driving rotary shaft 52 and permanent magnets 56, and opposite end portions of the driving rotary shaft 52 are bearing-supported by a coil frame 55. In the permanent magnets 56 two, NS, poles are formed around the periphery, and the driving gear 53 is attached to the driving rotary shaft 52. Further, the stator coil 51 is comprised of the coil frame 55 and coil 58 wound around the frame. The coil frame 55 is divided into two, left and right, or upper and lower, portions to incorporate the rotor into the inside. A bracket 57 is integrally formed in the coil frame 55, and the yoke 54 is fitted and installed on the periphery.

In such a configuration, when power is applied to the coil 58, the magnet rotor 50 rotates a predetermined angle forward or backward in a clockwise direction or a counterclockwise direction to rotate the driving gear 53 forward and backward. Thus configured driving unit M is fastened in the bracket 57 to the mount 46 of the hold plate 41 with screws or the like. Then, the driving gear 53 meshes with the passive teeth 35 of the driving ring 31. By this means, the driving ring 31 reciprocates by a predetermined angle in a clockwise direction and counterclockwise direction in FIG. 3, and opens and closes the diaphragm blades 21.

[Explanation of the Assemble State]

The assemble state of the light quantity adjustment apparatus A will be described according to FIG. 1. The first guide plate 15 is overlaid on the base plate 11 configured as described above. At this point, the positioning pins 17 provided in the base plate 11 are fitted into positioning holes 18 of the first guide plate 15 to position both of the members.

The base plate 11 and the first guide plate 15 are overlaid, and as shown in FIG. 2, first to ninth diaphragm blades 21a to 21i are overlaid on the first guide plate 15. At this point, the guide pin (first protrusion) 22 of the each blade member 21 is fitted into the guide groove 13 and guide groove 16.

Next, as shown in FIG. 3, the second guide plate 36 is overlaid on each of the blade members 21a to 21i, and the operating pin (second protrusion) 23 of each of the blade members 21a to 21i is fitted into the engagement hole 37 on the plate side. Then, the hold plate 41 is overlaid on the reinforcing plate 42, and further, is overlaid on the second guide plate 36. At this point, the driving gear 53 of the driving unit M mounted on the hold plate 41 is meshed with the passive teeth 35 of the driving ring 31.

Then, the base plate 11 and hold plate 41 are fixed with fixing screws. By this means, the base plate 11, first guide plate 15, blade members 21, second guide plate 36, driving ring 31, reinforcing plate 42, and hold plate 41 are successively stacked upward and integrated.

[Open/Close Action of the Blades]

The open/close action of the diaphragm blades will be described below according to FIGS. 8A and 8B. FIG. 8A shows a state in which a plurality of diaphragm blades is disposed around the light-path aperture 12, and FIG. 8B shows an open/close action state of one of the plurality of diaphragm blades. A plurality of diaphragm blades 21a to 21i is disposed in positions (in the apparatus shown in the figure, nine blades in positions spaced an angle of 40 degrees) spaced a predetermined angle with reference to the light-path center O in the shape of scales. In each of the diaphragm blades 21a to 21i, the first protrusion (guide pin) 22 is fitted into the guide groove 13 formed in the base plate 11. Concurrently therewith, the second protrusion (operating pin) 23 formed in each of the diaphragm blades 21a to 21i is fitted into the fit hole 33 of the driving ring 31.

Then, the driving ring 31 rotates about the light-path center O in a clockwise direction and a counterclockwise direction in the range of a predetermined angle by the driving unit M described previously. The open/close action of the blade at this point will be described according to FIG. 8B. The operating pin (second protrusion) 23 rotationally shifts from point c to point d in a clockwise direction in FIG. 8B by the arc trajectory x-x with a radius L from the light-path center O shown in the figure by rotation of the driving ring 31. Further, the guide pin (first protrusion) 22 shifts from point a to point b by the trajectory y-7y along the guide groove 16.

By the shifts of the operating pin (second protrusion) 23 and the guide pin (first protrusion) 22, the diaphragm blade 21 is opened and closed from the solid line (open state) in FIG. 8B to the dashed lines (closed state) in FIG. 8B. In addition, in the apparatus shown in the figure, the light-path aperture 12 is set for a small diaphragm state with a small diameter in the closed state, while being set for a full open state in the open state. Accordingly, corresponding to the current supplied to the driving unit M, the diaphragm blades 21 are opened and closed in arbitrary aperture diameters from the small diaphragm state to the full open state, and adjust the quantity of light passing through the light-path aperture 12 to be larger and smaller.

[Image Pickup Apparatus]

Figure 10:
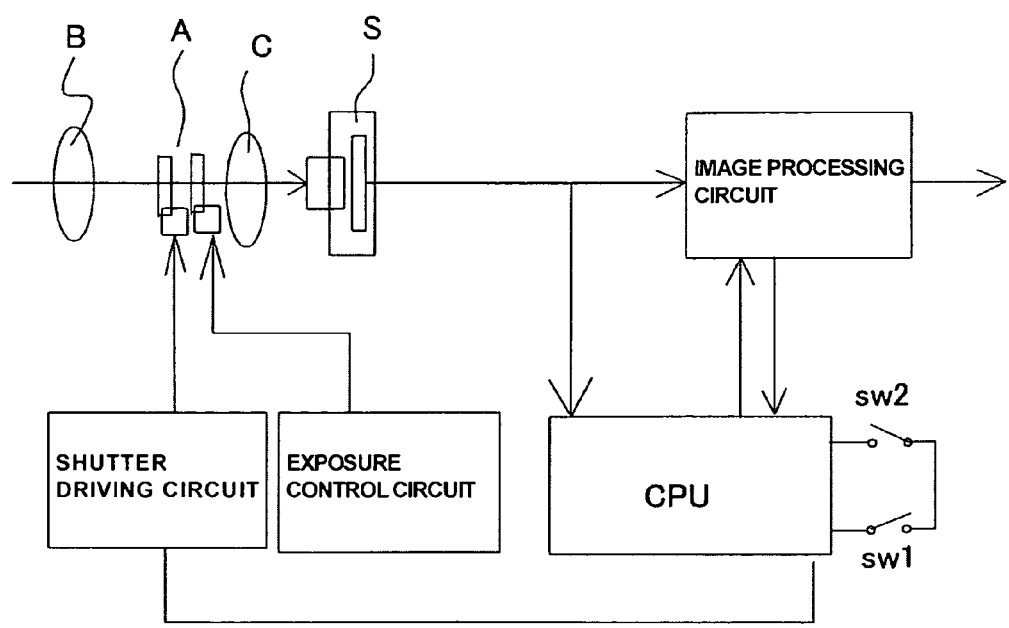
FIG. 10 is a conceptual explanatory view of an image pickup apparatus with the apparatus of FIG. 1 incorporated thereinto.

An image pickup apparatus using the above-mentioned light quantity adjustment apparatus A will be described based on FIG. 10. The above-mentioned light quantity adjustment apparatus is incorporated into a lens barrel of a still camera, video camera, etc. "B" shown in the figure denotes a front lens disposed in the shooting light path, "C" in the figure denotes a back lens, an image of a subject image is formed by the lenses, and an image pickup means S is disposed in the image formation surface. As the image pickup means S, a solid image pickup element such as a CCD, a photosensitive film or the like is used. Then, it is configured that control is executed by a CPU control circuit, exposure control circuit, and shutter driving circuit. "SW1" shown in the figure denotes a main power supply switch, and "SW2" denotes a shutter release switch. As control as a camera apparatus, as well as the circuits, an autofocus circuit or the like is used, the configuration is well known, and therefore, the description is omitted.

Then, a diaphragm apparatus E and shutter apparatus (not shown) are installed in between the front lens B and back lens C incorporated into the lens barrel. Into the diaphragm apparatus E are incorporated the diaphragm blades 21 as described previously and the driving unit M. Then, the control CPU sets shooting conditions such as an exposure amount and shutter speed, and issues direction signals to the exposure control circuit and shutter driving circuit. First, as the exposure amount, the exposure control circuit supplies a current in the predetermined direction to the coil of the driving apparatus M by a direction signal from the control CPU. Then, the rotation of the driving apparatus M is conveyed to the diaphragm blades 21 from the operating pins 23 via the driving gear 53, and the diaphragm blades 21 stop the light-path aperture 12 to an optimal exposure amount.

Next, when a release button is operated, in the case of the solid image pickup device such as a CCD, the already charged charge is released, and shooting is started. Then, after a lapse of exposure time beforehand set by the control CPU, the shutter driving circuit receives a signal for starting shutter action, and supplies a current in the shutter close direction to the coil of the driving apparatus. After the shutter action, in the case that the image pickup means S is the CCD (solid image pickup element), image data is transferred to an image processing circuit and stored in a memory or the like.

In addition, this application claims priority from Japanese Patent Application No. 2010-258164, Japanese Patent Application No. 2010-259364, and Japanese Patent Application No. 2010-261453, incorporated herein by reference.

What is claimed is:

1. A light quantity adjustment apparatus, comprising:
a first substrate comprising a first light-path aperture and a plurality of concave guide grooves;
a second substrate comprising a second light-path aperture;
a plurality of diaphragm blades comprising a plurality of first protrusions, and disposed between the first substrate and the second substrate to adjust a quantity of light passing through the first light-path aperture and the second light-path aperture;
a first guide plate made of a resin film, disposed between the first substrate and the plurality of diaphragm blades, and comprising a plurality of plate guide through holes;
a driving ring that opens and closes the plurality of diaphragm blades; and
a driving unit configured to rotate the driving ring by a predetermined rotation angle,
wherein the plurality of first protrusions is configured to fit into the plurality of concave guide grooves and the plurality of plate guide through holes to guide the plurality of diaphragm blades in an open/close direction, and
the plurality of plate guide through holes of the first guide plate has a width which is narrower than a width of the plurality of concave guide grooves of the first substrate.

2. The light quantity adjustment apparatus according to claim 1, wherein the width of the plurality of plate guide through holes is larger than a diameter of the plurality of first protrusions.

3. The light quantity adjustment apparatus according to claim 1, further comprising a second guide plate comprising a plurality of engagement holes, disposed between the driving ring and the plurality of diaphragm blades,
wherein the driving ring comprises a third light-path aperture and a plurality of fit holes,
the first light-path aperture, the second light-path aperture, and the third light-path aperture are disposed substantially at a center part of the first substrate, the second substrate, and the driving ring, respectively,
the first substrate, the plurality of diaphragm blades, the driving ring, and the second substrate are layered in this order,
the plurality of diaphragm blades further comprises a plurality of second protrusions configured to fit into the plurality of engagement holes and the plurality of fit holes,
the plurality of fit holes has a diameter which is smaller than a diameter of the plurality of engagement holes.

4. The light quantity adjustment apparatus according to clam 3, wherein
the first substrate and the first guide plate each are a ring-shaped plate, and
the plurality of the concave guide grooves and the plurality of the plate guide through holes have a shape extending in the open/close direction of the plurality of diaphragm blades along a ring-shape of the first substrate and the first guide plate.

5. A light quantity adjustment apparatus, comprising:
a pair of substrates comprising a first substrate and a second substrate and having a light-path aperture;
a plurality of diaphragm blades disposed between the pair of substrates to adjust a quantity of passing light of the light-path aperture;
a driving ring that opens and closes the plurality of diaphragm blades; and
a driving unit for rotating the driving ring for a predetermined rotation angle,
wherein the plurality of diaphragm blades is supported by the first substrate via a first guide plate made of a resin film,
the first substrate and the first guide plate are provided with guide grooves that are fitted into first protrusions formed in the plurality of diaphragm blades to guide the blades in an open/close direction,
the guide grooves of the first substrate are formed of concave grooves,
the guide grooves of the first guide plate are formed of through holes, and
the through holes of the first guide plate have a narrower width than a width of the concave grooves of the first substrate to engage in the first protrusions of the diaphragm blades, and guide the diaphragm blades in the open/close direction.

6. The light quantity adjustment apparatus according to claim 5, wherein the first guide plate is formed in a shape of a ring having a light-path aperture at a center thereof.

7. The light quantity adjustment apparatus according to claim 5, wherein the guide grooves of the first substrate and the guide grooves of the first guide plate are formed in the open/close direction of the plurality of diaphragm blades.

8. The light quantity adjustment apparatus according to claim 1, wherein the plurality of diaphragm blades is formed by performing die-cutting forming on a resin sheet, and is supported so that corruption surfaces in die-cutting forming come into contact with the first guide plate.

9. The light quantity adjustment apparatus according to claim 1, wherein the driving ring is formed in a shape of a ring that concurrently opens and closes the plurality of diaphragm blades, and
the plurality of diaphragm blades is supported between the first substrate and the driving ring.

10. The light quantity adjustment apparatus according to claim 9, wherein the driving ring has fit holes that engage second protrusions formed in the plurality of diaphragm blades to open and close the blades.

11. The light quantity adjustment apparatus according to claim 1, wherein the pair of substrates, the diaphragm blades, and the driving ring form a light-path aperture substantially at a center thereof,
the first substrate, the diaphragm blades, the driving ring, and the second substrate are overlaid in this order in a layered form,
the first guide plate is provided between the first substrate and the diaphragm blades,
a second guide plate is provided between the driving ring and the diaphragm blades,
the guide grooves that are fitted into the first protrusions formed in the plurality of diaphragm blades are formed in the first substrate and the first guide plate,
engagement holes that engage in second protrusions formed in the plurality of diaphragm blades are formed in the driving ring and the second guide plate,
the guide grooves formed in the first guide plate have a width narrower than a width of the guide grooves formed in the first substrate, and fit holes formed in the driving ring have a diameter smaller than a diameter of fit holes formed in the second guide plate.

12. The light quantity adjustment apparatus according to claim 11, wherein the plurality of diaphragm blades, the first guide plate, and the second guide plate are formed of the same material.

13. The light quantity adjustment apparatus according to claim 12, wherein the plurality of diaphragm blades, the first guide plate, and the second guide plate are formed by performing die-cutting forming on a synthetic resin sheet.

14. The light quantity adjustment apparatus according to claim 11, wherein the driving unit is attached to the second substrate, and comprises a driving rotary shaft, and a driving gear that conveys rotation of the driving rotary shaft to the driving ring,
the driving ring is provided with a cut portion recessed inside an open/close trajectory of the diaphragm blades, and a passive tooth-form portion that is formed in an end face of the cut portion and that meshes with the driving gear, and
the second guide plate that backup-supports a blade so as to prevent the blade from sinking into the cut portion is provided between the cut portion of the driving ring and the diaphragm blades.

15. The light quantity adjustment apparatus according to claim 14, wherein the second guide plate is a ring-shaped plate provided between the plurality of diaphragm blades and the driving ring.

16. The light quantity adjustment apparatus according to claim 14, wherein the second guide plate comprises the same material as the plurality of diaphragm blades, while being formed of a sheet material thinner than a thickness of the blades.

17. The light quantity adjustment apparatus according to claim 14, wherein the second guide plate and the driving ring are integrally formed.

18. An image pickup apparatus, comprising:
an image formation lens for performing image formation on light from a subject;
an image pickup device for receiving light from the image formation lens; and
the light quantity adjustment apparatus according to claim 1 disposed in a light path from the subject to the image formation lens.

19. A light quantity adjustment apparatus, comprising:
a pair of substrates comprising a first substrate and a second substrate and having a light-path aperture;
a plurality of diaphragm blades disposed between the pair of substrates to adjust a quantity of passing light of the light-path aperture;
a driving ring that opens and closes the plurality of diaphragm blades; and
a driving unit for rotating the driving ring for a predetermined rotation angle,
wherein the plurality of diaphragm blades is supported by the first substrate via a first guide plate made of a resin film,
the first substrate and the first guide plate are provided with guide grooves that are fitted into first protrusions formed in the plurality of diaphragm blades to guide the blades in an open/close direction,
the guide grooves of the first substrate are formed of concave grooves,
the guide grooves of the first guide plate are formed of through holes,
the through holes of the first guide plate have a narrower width than a width of the concave grooves of the first substrate to engage in the first protrusions of the diaphragm blades, and guide the diaphragm blades in the open/close direction,
the pair of substrates, the diaphragm blades, and the driving ring form a light-path aperture substantially at a center thereof,
the first substrate, the diaphragm blades, the driving ring, and the second substrate are overlaid in this order in a layered form,
the first guide plate is provided between the first substrate and the diaphragm blades,
a second guide plate is provided between the driving ring and the diaphragm blades,
the guide grooves that are fitted into the first protrusions formed in the plurality of diaphragm blades are formed in the first substrate and the first guide plate,
engagement holes that engage in second protrusions formed in the plurality of diaphragm blades are formed in the driving ring and the second guide plate,
the guide grooves formed in the first guide plate have a width narrower than a width of the guide grooves formed in the first substrate,
fit holes formed in the driving ring have a diameter smaller than a diameter of fit holes formed in the second guide plate,
the driving ring is provided with a cut portion recessed inside an open/close trajectory of the diaphragm blades, and a passive tooth-form portion that is formed in an end face of the cut portion and that meshes with a driving gear provided in a driving apparatus, and
the second guide plate backup-supports a blade so as to prevent the blade from sinking into the cut portion.

* * * * *